United States Patent
Gardner et al.

(10) Patent No.: US 11,093,833 B1
(45) Date of Patent: Aug. 17, 2021

(54) MULTI-OBJECTIVE DISTRIBUTED HYPERPARAMETER TUNING SYSTEM

(71) Applicant: SAS Institute Inc., Cary, NC (US)

(72) Inventors: Steven Joseph Gardner, Cary, NC (US); Joshua David Griffin, Harrisburg, NC (US); Yan Xu, Cary, NC (US); Patrick Nathan Koch, Morrisville, NC (US); Brett Alan Wujek, Cary, NC (US); Oleg Borisovich Golovidov, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/081,118

(22) Filed: Oct. 27, 2020

Related U.S. Application Data

(60) Provisional application No. 62/977,456, filed on Feb. 17, 2020.

(51) Int. Cl.
| | |
|---|---|
| *G06N 3/12* | (2006.01) |
| *G06N 5/00* | (2006.01) |
| *G06N 20/00* | (2019.01) |

(52) U.S. Cl.
CPC ............ *G06N 3/126* (2013.01); *G06N 5/003* (2013.01); *G06N 20/00* (2019.01)

(58) Field of Classification Search
CPC ........ G06N 3/126; G06N 20/00; G06N 5/003; G06N 3/12; G06N 3/08; G06B 5/003
See application file for complete search history.

(56) References Cited

U.S. PATENT DOCUMENTS

2018/0240041 A1* 8/2018 Koch ................ G06F 16/24578

OTHER PUBLICATIONS

T.W. Hill Jr. and A. Ravindran, "Technical Note: On Programming with Absolute-Value Functions," Journal of Optimization Theory and Applications: vol. 17, Nos. 1/2, 1975 (Year: 1975).*
Y. Jin and B. Sendhoff, "Pareto-based multiobjective machine learning: An overview and case studies," Trans. Sys. Man Cyber Part C, vol. 38, No. 3, pp. 397-415, 2008. (Year: 2008).*

(Continued)

*Primary Examiner* — Miranda M Huang
*Assistant Examiner* — Yao D Huang
(74) *Attorney, Agent, or Firm* — Bell & Manning, LLC

(57) ABSTRACT

Tuned hyperparameter values are determined for training a machine learning model. When a selected hyperparameter configuration does not satisfy a linear constraint, if a projection of the selected hyperparameter configuration is included in a first cache that stores previously computed projections is determined. When the projection is included in the first cache, the projection is extracted from the first cache using the selected hyperparameter configuration, and the selected hyperparameter configuration is replaced with the extracted projection in the plurality of hyperparameter configurations. When the projection is not included in the first cache, a projection computation for the selected hyperparameter configuration is assigned to a session. A computed projection is received from the session for the selected hyperparameter configuration. The computed projection and the selected hyperparameter configuration are stored to the first cache, and the selected hyperparameter configuration is replaced with the computed projection.

30 Claims, 20 Drawing Sheets

(56) References Cited

OTHER PUBLICATIONS

Shabbir Ahmed, "Linear Programming: Geometry, Algebra and the Simplex Method" (Nov. 27, 2017 archived copy), retrieved from: https://web.archive.org/web/20171127075334/http://www2.isye.gatech.edu/~sahmed/isye3133b/simplex (Year: 2017).*
Koch et al., "Autotune: A Derivative-free Optimization Framework for Hyperparameter Tuning" arXiv:1804.07824v2 [cs.LG] Aug. 2, 2018. (Year: 2018).*
John W. Chinneck, "The Constraint Consensus Method for Finding Approximately Feasible Points in Nonlinear Programs," INFORMS Journal on Computing, vol. 16, No. 3, Summer 2004, pp. 255-265 (Year: 2004).*
Gardner et al., Constrained Multi-Objective Optimization for Automated Machine Learning, arXiv:1908.04909, Aug. 2019, 10 pages.
Wikipedia, Cholesky decomposition, retrieved from https://en.wikipedia.org/w/index.php?title=Cholesky_decomposition&oldid=958717026, last edited May 25, 2020.
Wikipedia, Error function, https://en.wikipedia.org/wiki/Error_function, last edited May 26, 2020.
Christopher K.I. Williams, "Bayesian Classification With Gaussian Processes," IEEE Transactions on Pattern Analysis and Machine Intelligence3, vol. 20, No. 12, Dec. 1998, pp. 1342-1351.
Yiangjian Wang, "Gaussian Process Classification," Power Point Presented at SAS Institute Inc. Aug. 2, 2019.
Gardner et al., Parallel Hybrid Multiobjective Derivate-Free Optimization for Machine Learning, SAS Power Point Presentation, Sas Institute, Inc., 2018.
Wikipedia, Lemmatisation, retrieved from https://en.wikipdia.org/w/index.php?title=Lemmatisation&oldid=948344582, last edited on Mar. 31, 2020.
Wikipedia, Logit, retrieved from https://en.wikipedia.org/w/index.pho?title=Logit&oldid=966729139, last edited Jul. 8, 2020.
Wikipedia, Pareto Front, retrieved from https://en.widipedia.org/w/index.php?title=Pareto_efficiency&oldid=950769447, last edited on Apr. 13, 2020.
Wikipedia, Probit, retrieved from https://en.widipedia.org/w/index.php?title=Probit&oldid=956140558, last edited May 11, 2020.
Rasmussen and Williams, "Gaussian Processes for Machine Learning" Chapter 3, Classification, the MIT Press, 2006.
Josh Griffin, "Constrained Multiobjective Derivate-Free Optimization for Machine Learning," 2019 SIAM Computational Science and Engineering Conference talk on Feb. 25, 2019.
Wikipedia, Sigmoid Function, retrieved from https://en.wikipedia.org/w/index.pho?title=Sigmoid_function&oldid=963563127, last edited Jun. 20, 2020.
1.7 Gaussian Processes, 2007-2019, scikit-learn developers.
J. D. Griffin, T. G. Kolda, and R. M. Lewis, "Asynchronous parallel generating set search for linearly constrained optimization," SIAM Journal on Scientific Computing, vol. 30, pp. 1892-1924, 2008.
J. D. Griffin and T. G. Kolda, "Nonlinearly constrained optimization using heuristic penalty methods and asynchronous parallel generating set search," Applied Mathematics Research Express, vol. 2010, pp. 36-62, 2010.
O. Schutze, X. Esquivel, A. Lara, and C. A. Coello Coello, "Using the averaged hausdorff distance as a performance measure in evolutionary multiobjective optimization," IEEE Transactions on Evolutionary Computation, vol. 16, pp. 504-522, 2012.

* cited by examiner

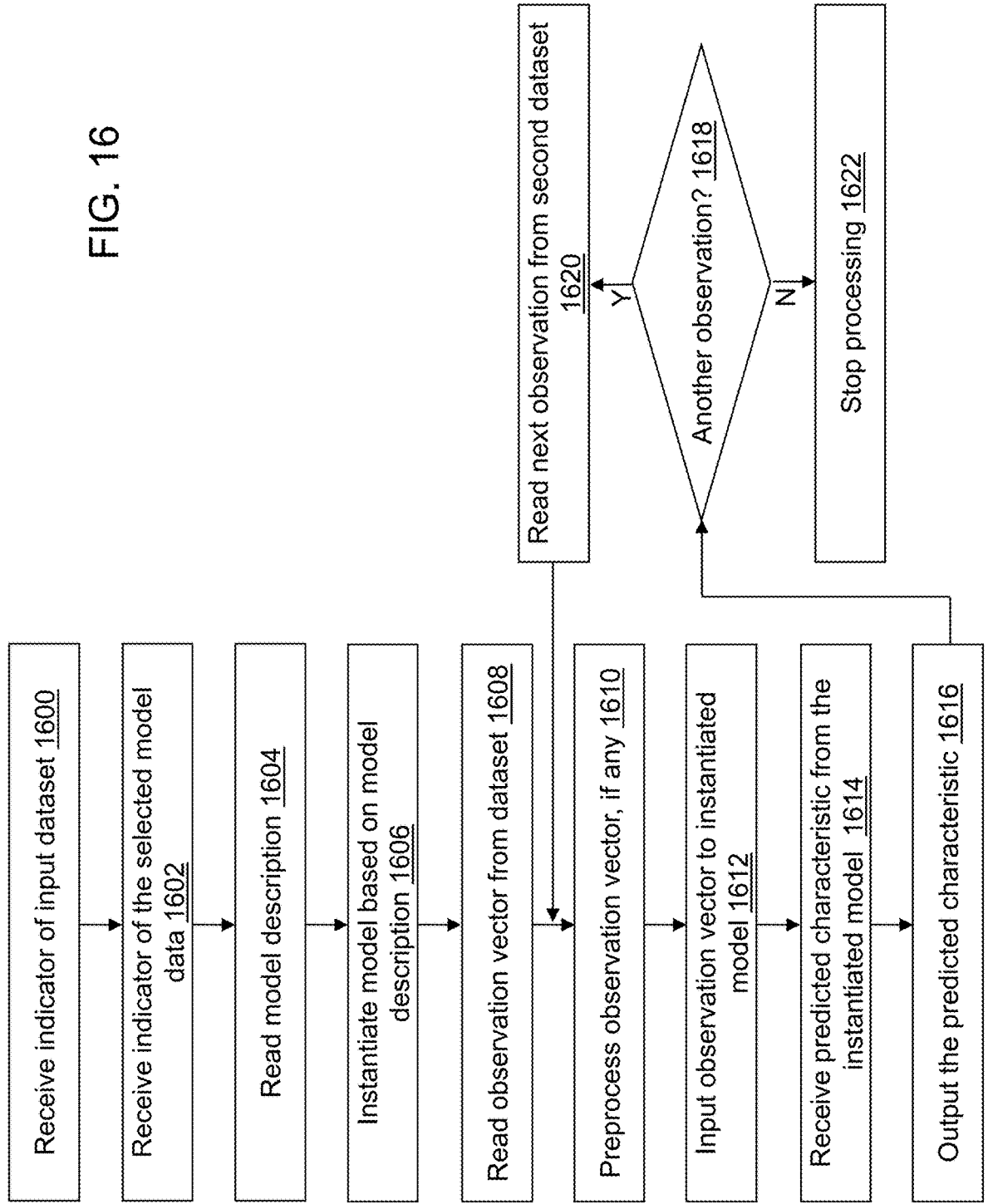

MULTI-OBJECTIVE DISTRIBUTED HYPERPARAMETER TUNING SYSTEM

CROSS-REFERENCE TO RELATED APPLICATIONS

The present application claims the benefit of and priority based on 35 U.S.C. § 119(e) to U.S. Provisional Patent Application No. 62/977,456 filed Feb. 17, 2020, the entire contents of which are hereby incorporated by reference.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data.

Determining hyperparameters associated with the classification model to determine the best model configuration is a complex optimization problem. Though the classification model solutions are influenced by the hyperparameters, there are typically no clear default values for the hyperparameters that generate a satisfactory classification model for a wide range of applications. Not only do the input values used for the hyperparameters dictate the performance of the training process, but more importantly they influence the quality of the resulting classification models. Even with expertise in setting the hyperparameters, the best values of these hyperparameters change with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to determine tuned hyperparameter values for training a machine learning model. (A) A plurality of hyperparameter configurations are determined using a search method of a search method type. Each hyperparameter configuration of the plurality of hyperparameter configurations includes a value for each hyperparameter of a plurality of hyperparameters. Each hyperparameter configuration of the plurality of hyperparameter configurations is a unique combination of values for the plurality of hyperparameters. The plurality of hyperparameter configurations are identified based on a predefined model type (B) A hyperparameter configuration is selected from the plurality of hyperparameter configurations. (C) If the selected hyperparameter configuration satisfies a linear constraint on at least one hyperparameter of the plurality of hyperparameters is determined. (D) When the selected hyperparameter configuration does not satisfy the linear constraint, if a projection of the selected hyperparameter configuration is included in a first cache that stores previously computed projections is determined. When the projection is included in the first cache, the projection is extracted from the first cache using the selected hyperparameter configuration, and the selected hyperparameter configuration is replaced with the extracted projection in the plurality of hyperparameter configurations. When the projection is not included in the first cache, a projection computation for the selected hyperparameter configuration is assigned to a session. A computed projection is received from the session for the selected hyperparameter configuration when the projection computation is complete by the session. The received computed projection and the selected hyperparameter configuration are stored to the first cache, and the selected hyperparameter configuration is replaced with the received computed projection in the plurality of hyperparameter configurations. (E) (B) through (D) are repeated until each hyperparameter configuration of the plurality of hyperparameter configurations in (A) is selected. (F) An objective function value is computed for each hyperparameter configuration of the plurality of hyperparameter configurations using a predefined objective function by training a model of the predefined model type using a respective hyperparameter configuration of the plurality of hyperparameter configurations and scoring the trained model. (G) A best hyperparameter configuration of the plurality of hyperparameter configurations is identified based on an extremum value of the computed objective function value for each hyperparameter configuration of the plurality of hyperparameter configurations. The identified best hyperparameter configuration is output.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to determine tuned hyperparameter values for training a machine learning model.

In yet another example embodiment, a method of determining tuned hyperparameter values for training a machine learning model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 16 depicts a flow diagram illustrating examples of operations performed by the prediction device of FIG. 15 in accordance with an illustrative embodiment.

DETAILED DESCRIPTION

Figure 1:
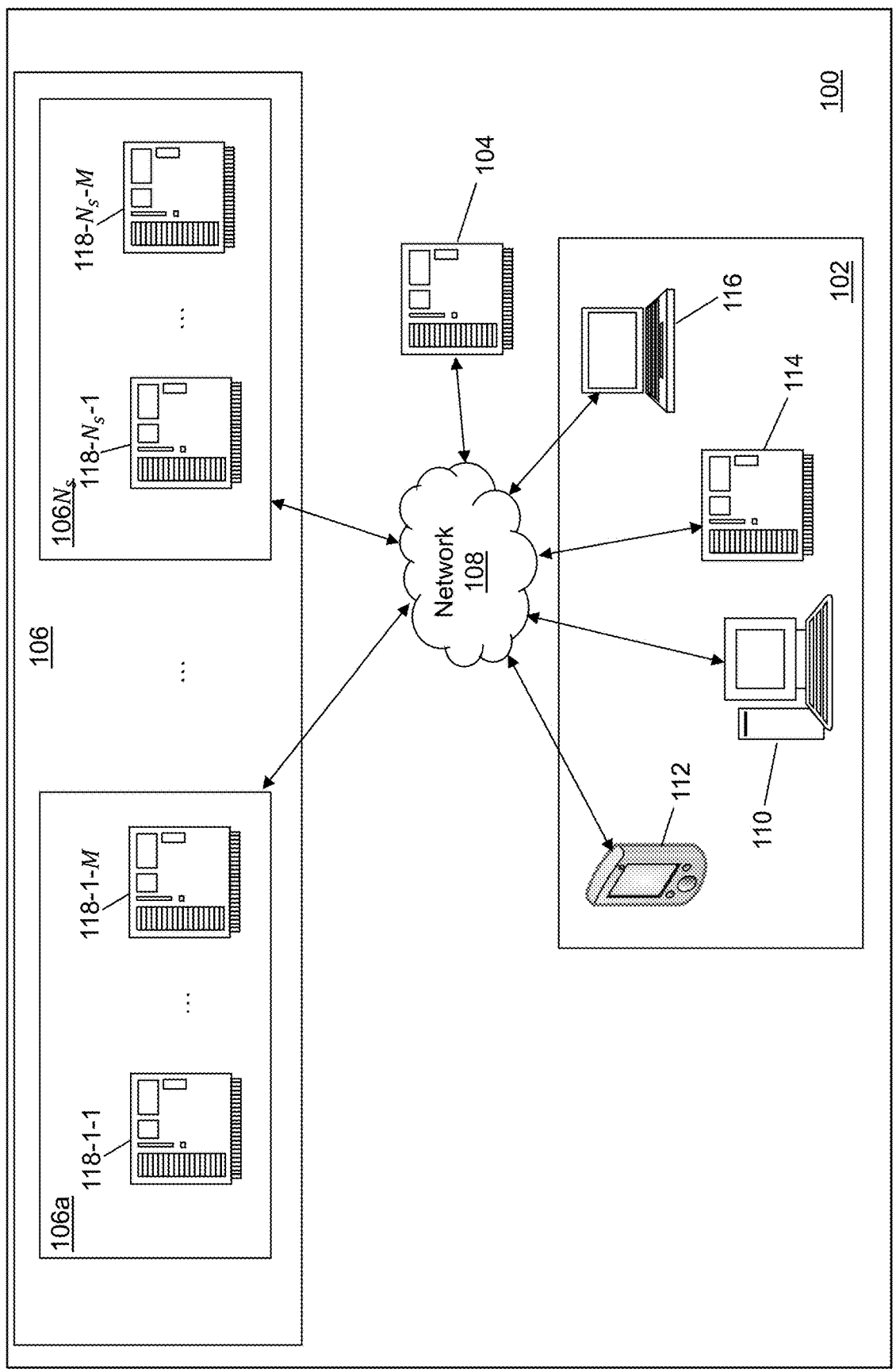
FIG. 1 depicts a block diagram of a hyperparameter selection system in accordance with an illustrative embodiment.

Referring to FIG. 1, a block diagram of a hyperparameter selection system 100 is shown in accordance with an illustrative embodiment. Hyperparameter selection system 100 provides an automated, distributed machine learning system that computes a Pareto front of optimized solutions for multiple objectives to allow a user to select hyperparameters automatically for training a machine learning model. Most of hyperparameter tuning systems only support a single objective function, typically accuracy or error, to assess and compare models during the automation process. However, building and selecting machine learning models is inherently a multi-objective optimization problem, in which trade-offs between accuracy, complexity, interpretability, fairness or inference speed are desired. There are a plethora of metrics for describing model performance such as precision, recall, F1 score, area under curve (AUC), informedness, markedness, and correlation to name a few. In general, each measure has an inherent bias resulting in a need to compare different performance measures when selecting the best models from a set of candidates. For example, relatively accurate models with minimal memory footprint and/or faster inference speed may be desired. Additionally, constraints may be associated with the objective function values that are difficult to incorporate into the machine learning model training algorithm itself. For example, a constraint could be added that indicates that the models have a misclassification rate less than 20% or a false positive rate less than 10%. Adding such constraints can steer hyperparameter selection system 100 toward a part of the search space that is more attractive to the user based upon their particular problem-specific needs.

There could also be a number of segments inherent within the data where it is important to have comparable accuracy across all segments. Instead of a single model, using multi-objective optimization, a set of models on a Pareto front are produced. In many real-world optimization problems including the tuning of machine learning models, the user is interested in optimizing two or more competing objectives—for example, model accuracy and model complexity. With multi-objective optimization, the multiple objectives can be optimized simultaneously and returned to the user as a Pareto front of solutions. A first Pareto front represents those solutions that are not dominated by any other solution found. A solution is nondominated when there are no other solutions better than that solution among all of the objective function results. A preferred model can be selected by balancing the multiple objective function results. Constraints provide a way to enforce restrictions or improve the search efficiency by pruning parts of the solution search space. Experimental results provided herein demonstrate the effectiveness of hyperparameter selection system 100 in multi-objective optimization and constraint handling.

A constrained multi-objective optimization problem may have the form:

$$\underset{h \in \mathbb{R}^n}{\text{minimize}} f(h) = (f_1(h), \ldots, f_{N_{obj}}(h))^T$$

$$\text{subject to } b_\ell \leq Ah \leq b_u$$

$$h_\ell \leq h \leq h_u$$

$$c_\ell \leq c(h) \leq c_u$$

where h is a vector of decision variables, n is a dimension of the real coordinate space that is the real numbers, $f(h)$ is a list of objective functions $f_1(h), \ldots, f_{N_{obj}}(h)$, $N_{obj} \geq 1$ is a number of objective functions, T indicates a transpose, $b_l$ is a vector of lower bounds defined for each linear constraint, A is a matrix in $\mathbb{R}^{N_v \times k}$ defining linear constraints, $N_v$ is a number of decision variables, k is a number of the linear constraints, $b_u$ is a vector of upper bounds defined for each linear constraint, $h_l$ is a vector of lower bounds defined for each linear constraint assuming that A=I, I is an identity matrix, $h_u$ is a vector of upper bounds defined for each linear constraint assuming that A=I, $c_\ell$ is a vector of lower bounds defined for each nonlinear constraint, c(h) is a list of nonlinear constraint functions: $\mathbb{R}^{N_v} \rightarrow \mathbb{R}^m$, m is the number of nonlinear constraints, and $c_u$ is a vector of upper bounds defined for each nonlinear constraint. $f(h)$ and c(h) can be treated as black-box nonlinear functions meaning no assumption is made concerning an internal structure though a mechanism is provided by the user to obtain $f(h_t)$ and $c(h_t)$ given a trial-point $h_t$ of decision variables. Hyperparameter selection system 100 solves the constrained multi-objective optimization problem within the context of training and validating machine learning models. As used herein, a decision variable may also be referred to as a hyperparameter of a machine learning model.

In an illustrative embodiment, hyperparameter selection system 100 may include a user system 102, a selection manager device 104, a worker system 106, and a network 108. Each of user system 102, selection manager device 104, and worker system 106 may be composed of one or more discrete computing devices in communication through network 108. Alternatively, user system 102, selection manager device 104, and worker system 106 may be integrated into a single computing device capable of computing using a plurality of different threads.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from selection manager device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
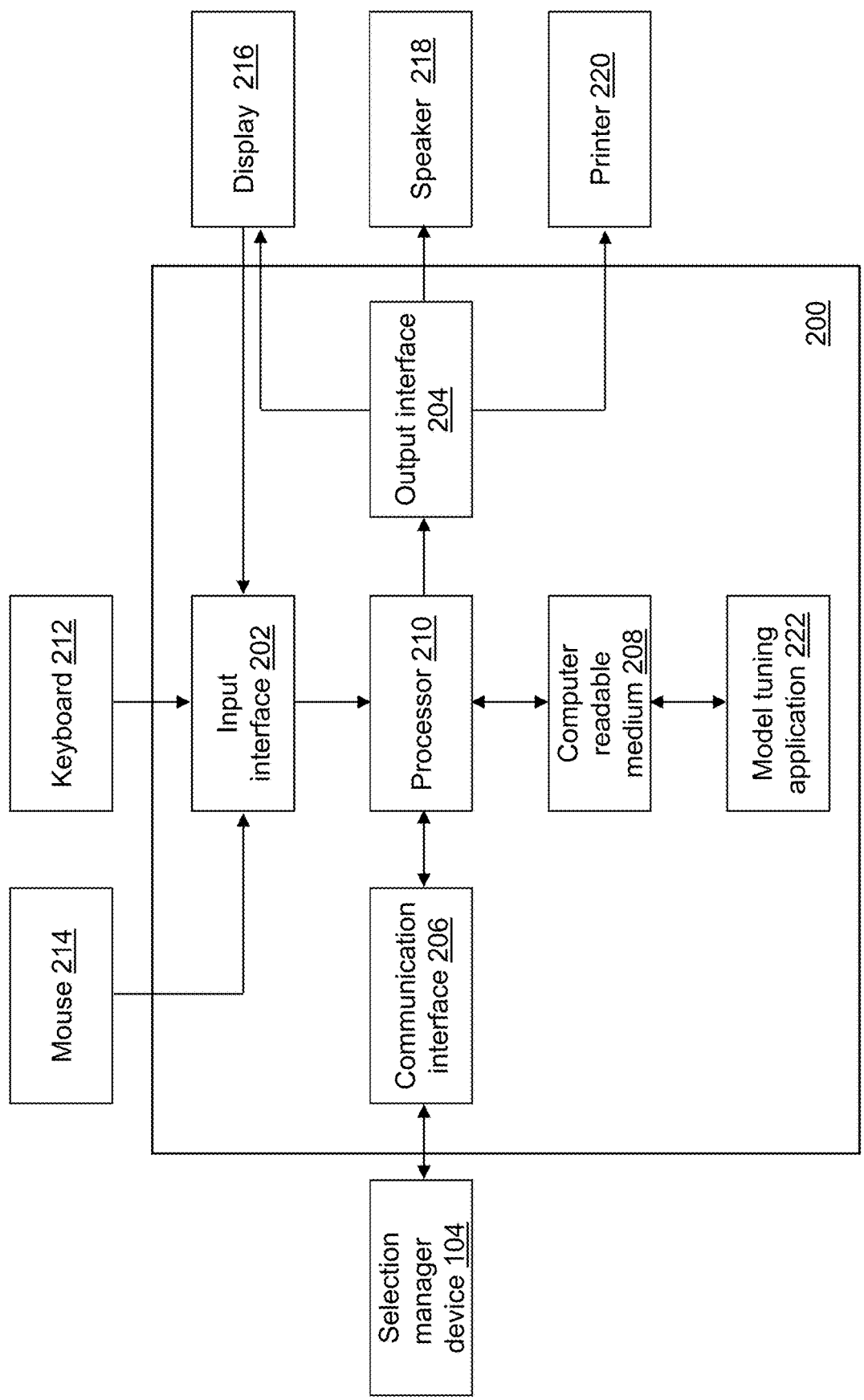
FIG. 2 depicts a block diagram of a user device of the hyperparameter selection system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, and a model tuning application 222. Each computing device of user system 102 may be executing model tuning application 222 of the same or different type.

Referring again to FIG. 1, selection manager device 104 can include any form factor of computing device. For illustration, FIG. 1 represents selection manager device 104 as a server computer. Selection manager device 104 may send and receive signals through network 108 to/from user system 102 and/or to/from worker system 106. Selection manager device 104 may communicate using various transmission media that may be wired and/or wireless as understood by those skilled in the art. Selection manager device 104 may be implemented on a plurality of computing devices of the same or different type. Hyperparameter selection system 100 further may include a plurality of selection manager devices.

Figure 3:
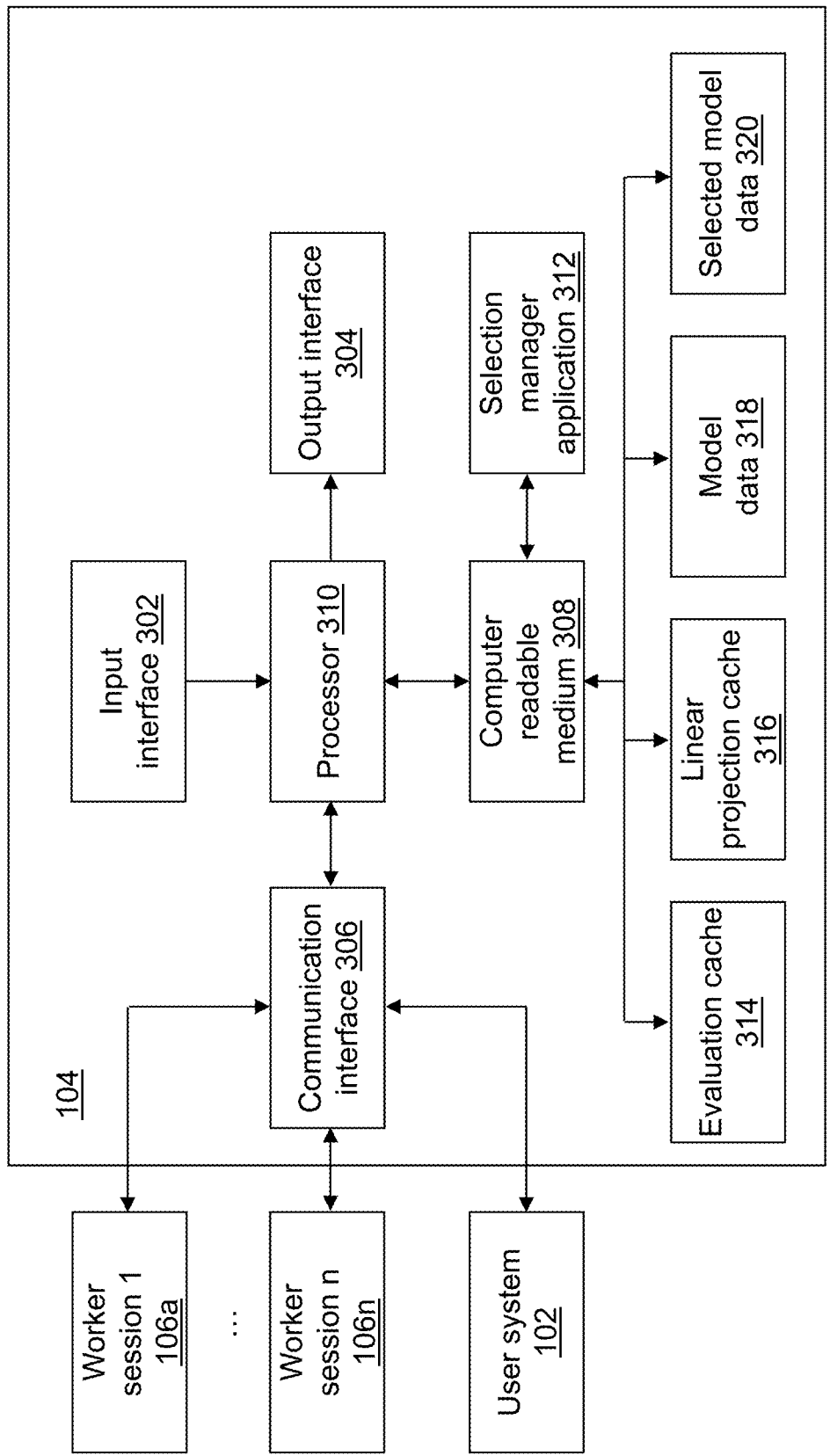
FIG. 3 depicts a block diagram of a selection manager device of the hyperparameter selection system of FIG. 1 in accordance with an illustrative embodiment.

For illustration, referring to FIG. 3, a block diagram of selection manager device 104 is shown in accordance with an illustrative embodiment. Selection manager device 104 may include a second input interface 302, a second output interface 304, a second communication interface 306, a second non-transitory computer-readable medium 308, a second processor 310, a selection manager application 312, an evaluation cache 314, a linear projection cache 316, model data 318, and selected model data 320. Evaluation cache 314, linear projection cache 316, model data 318, and selected model data 320 are created from results generated by worker system 106. Evaluation cache 314 allows the hyperparameter tuning process to remain efficient by only evaluating "close" points once. Evaluation cache 314 may be stored in memory using various data structures such as a list, an array, a tree, etc. For example, evaluation cache 314 may be stored as a splay tree and use lexicographical ordering so that the points that are most recently added are near the root of the tree for faster searching. Similarly, linear projection cache 316 may be stored as a splay tree and use and lexicographical ordering so that the points that are most recently added are near the root of the tree for faster searching. The lexicographical ordering refers to the way that two points are compared for equality. Each of the variables defined for the points are compared one variable at a time. As soon as a difference greater than a predefined tolerance value is identified, the points are declared as non-equal. If all of the variables are equal within the predefined tolerance value, the points are declared as equal.

Referring again to FIG. 1, the one or more computing devices of worker system 106 may include computers of any form factor that may be organized into one or more sessions, where a number of the one or more sessions is indicated by $N_s$. Worker system 106 may include a number of computing devices indicated by W. Worker system 106 may include computers of other form factors such as a desktop or a laptop, etc. Worker system 106 can include any number and any combination of form factors of computing devices organized into any number of sessions. For example, in the illustrative embodiment, worker system 106 includes a first worker session 106a, . . . , and an $N_s^{th}$ worker session 106$N_s$. Each session may include one or more computing devices, where a number of session computing devices in each session is indicated by M. In the illustrative embodiment, first worker session 106a may include a first computing device 118-1-1, . . . , and an Mth computing device 118-1-M, and $N_s^{th}$ worker session 106$N_s$ may include a first computing device 118-$N_s$-1, . . . , and an Mth computing device 118-$N_s$-M. The number of computing devices indicated by W=$N_s$*M may or may not also include selection manager device 104. A number of threads may be associated with each computing device of worker system 106.

The computing devices of worker system 106 may send and receive signals through network 108 to/from selection manager device 104 and/or to/from user system 102 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4A:
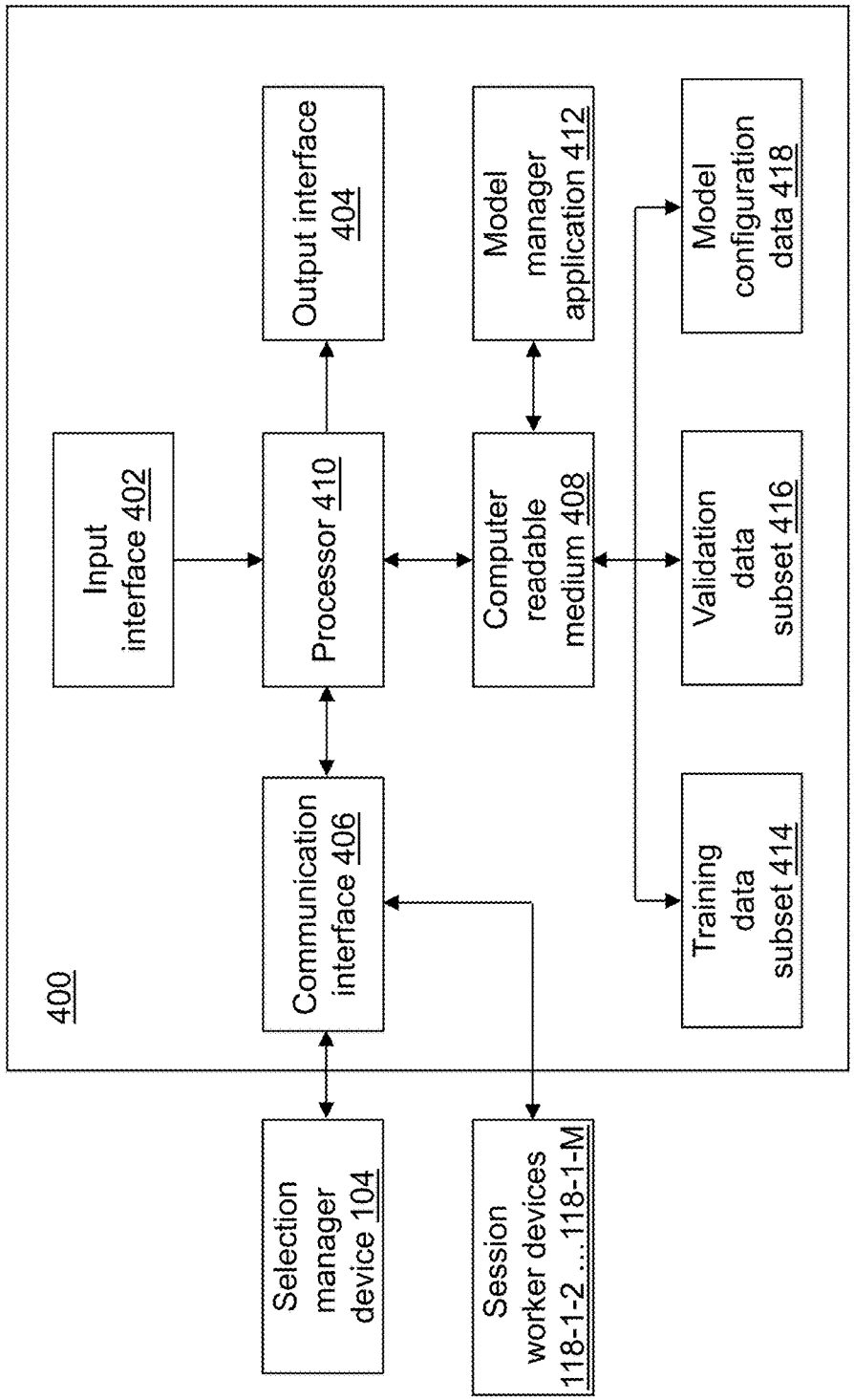
FIG. 4A depicts a block diagram of a session manager device of the hyperparameter selection system of FIG. 1 in accordance with an illustrative embodiment.

For illustration, referring to FIG. 4A, a block diagram of a session manager device 400 is shown in accordance with an example embodiment. Session manager device 400 is an example computing device selected from each session of worker system 106. For example, a first computing device of each session, such as first computing device 118-1-1 of first worker session 106a and first computing device 118-$N_s$-1 of $N_s^{th}$ worker session 106$N_s$ may be an instance of session manager device 400. In the illustrative embodiment of FIG. 4A, session manager device 400 is the session manager device for first worker session 106a referred to as first computing device 118-1-1 that communicates with a second computing device 118-1-2, . . . , and Mth computing device 118-1-M. Session manager device 400 may include a third input interface 402, a third output interface 404, a third communication interface 406, a third computer-readable medium 408, a third processor 410, a model manager application 412, a training data subset 414, a validation data subset 416, and model configuration data 418.

Figure 4B:
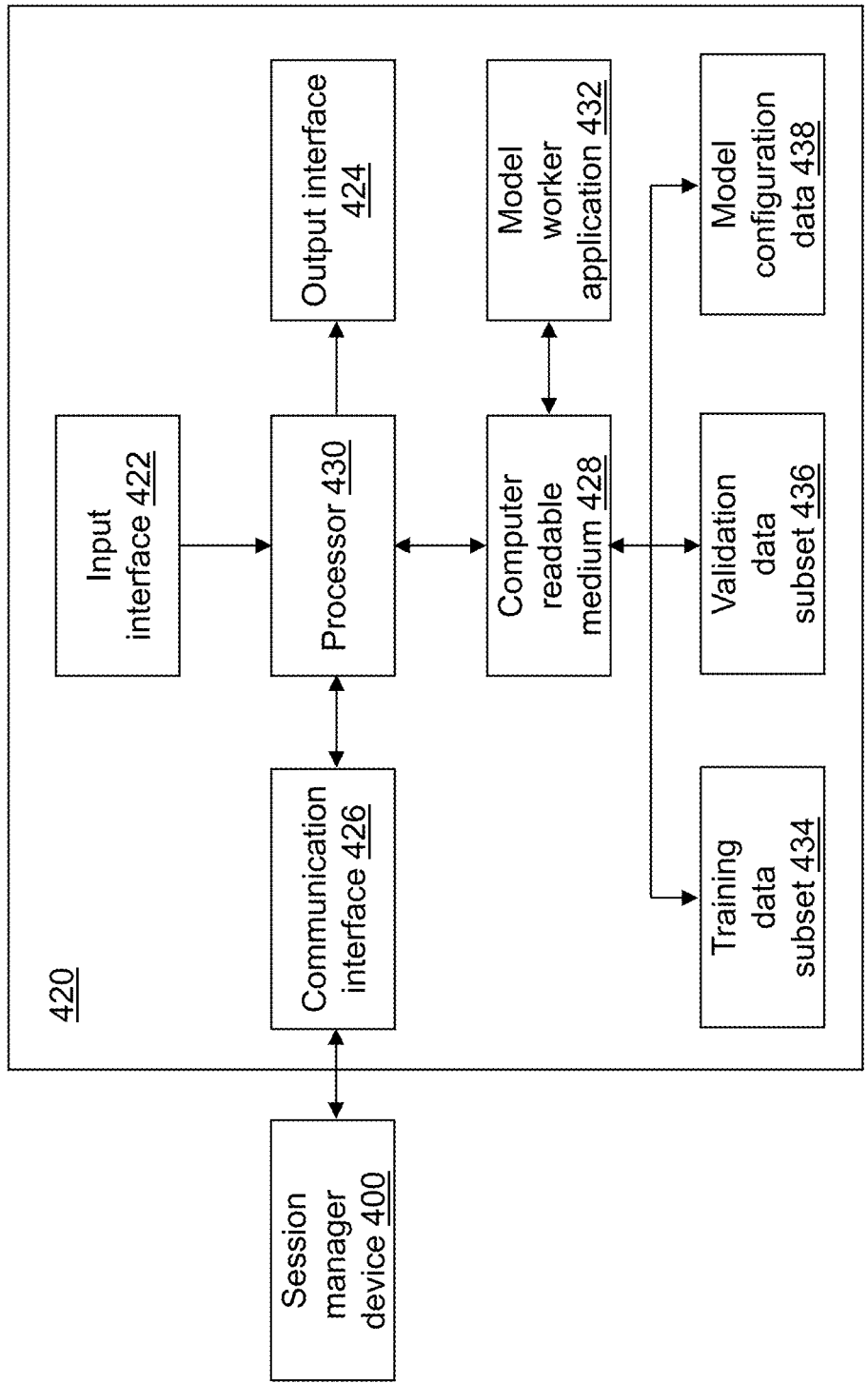
FIG. 4B depicts a block diagram of a session worker device of the hyperparameter selection system of FIG. 1 in accordance with an illustrative embodiment.

For illustration, referring to FIG. 4B, a block diagram of a session worker device 420 is shown in accordance with an example embodiment. Session worker device 420 is an example worker computing device of each session of worker system 106 excluding each session manager device 400. For example, remaining computing devices of each session, such as second computing device 118-1-2, . . . , and Mth computing device 118-1-M of first worker session 106a may each be an instance of session worker device 420. Session worker device 420 may include a fourth input interface 422, a fourth output interface 424, a fourth communication interface 426, a fourth computer-readable medium 428, a fourth processor 430, a model worker application 432, a training data subset 434, a validation data subset 436, and model configuration data 438.

Model manager application 412 may coordinate generation of trained machine learning models using model worker application 432 executing at the one or more session worker devices 420 assigned to the session with their allocated subset of training data and validation data designated as training data subset 434 and validation data subset 436, respectively. Session manager device 400 may or may not include an allocation of training data and validation data designated as training data subset 414 and validation data subset 436, respectively. For example, session manager device 400 may coordinate the distribution of the training data and the validation data with or without storing a portion on third computer-readable medium 408.

Referring again to FIG. 2, each user device 200 of user system 102 may include the same or different components and combination of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 that includes a touch screen both allows user input and presents output to the user. User device 200 may have one or more input interfaces that use the same or a different input interface technology. The input interface technology further may be accessible by user device 200 through communication interface 206.

Output interface 204 provides an interface for outputting information from user device 200, for example, to a user of user device 200 or to another device. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and selection manager device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Model tuning application 222 performs operations associated with identifying a first Pareto front of hyperparameter configurations where each hyperparameter configuration defines a value for each hyperparameter used to train the classification model. In many real-world applications, minimizing a single objective is not sufficient. Many times, users need to consider multiple objectives. For example, minimize misclassification error of a model while also minimizing the model's complexity or minimizing the misclassification error of a model while also minimizing the model's false positive rate. By performing multi-objective optimization, a first Pareto front set of solutions is returned to the user. This front Pareto set (or nondominated set) contains solutions where a user can explore the trade-offs between their competing objectives and make the best choice for their particular use case. The operations may be implemented using hardware, firmware, software, or any combination of these methods. Referring to the example embodiment of FIG. 2, model tuning application 222 is implemented in software (comprised of computer-readable and/or computer-executable instructions) stored in computer-readable medium 208 and accessible by processor 210 for execution of the instructions that embody the operations of model tuning application 222. Model tuning application 222 may be written using one or more programming languages, assembly languages, scripting languages, etc.

Model tuning application 222 may be implemented as a Web application. For example, model tuning application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Referring again to FIG. 3, fewer, different, or additional components may be incorporated into selection manager device 104. Second input interface 302 provides the same or similar functionality as that described with reference to input interface 202 of user device 200 though referring to selection manager device 104. Second output interface 304 provides the same or similar functionality as that described with reference to output interface 204 of user device 200 though referring to selection manager device 104. Second communication interface 306 provides the same or similar functionality as that described with reference to communication interface 206 of user device 200 though referring to selection manager device 104. Data and messages may be transferred between selection manager device 104 and/or user device 200 and session manager device 400 using second communication interface 306. Second computer-readable medium 308 provides the same or similar functionality as that described with reference to computer-readable medium 208 of user device 200 though referring to selection manager device 104. Second processor 310 provides the same or similar functionality as that described with reference to processor 210 of user device 200 though referring to selection manager device 104.

Selection manager application 312 performs operations associated with selecting sets of hyperparameter configurations to evaluate based on inputs provided by user device 200. Selection manager application 312 requests that the computing devices of worker system 106 generate a trained classification model for each hyperparameter configuration in the selected sets of hyperparameter configurations. The operations may be implemented using hardware, firmware, software, or any combination of these methods. Referring to the example embodiment of FIG. 3, selection manager application 312 is implemented in software (comprised of computer-readable and/or computer-executable instructions) stored in second computer-readable medium 308 and accessible by second processor 310 for execution of the instructions that embody the operations of selection manager application 312. Selection manager application 312 may be written using one or more programming languages, assembly languages, scripting languages, etc. Selection manager application 312 may be implemented as a Web application.

Referring again to FIG. 4A, fewer, different, and additional components may be incorporated into session manager device 400. Each session manager device 400 of each session of worker system 106 may include the same or different components or combination of components.

Third input interface 402 provides the same or similar functionality as that described with reference to input interface 202 of user device 200 though referring to session manager device 400. Third output interface 404 provides the same or similar functionality as that described with reference to output interface 204 of user device 200 though referring to session manager device 400. Third communication interface 406 provides the same or similar functionality as that described with reference to communication interface 206 of user device 200 though referring to session manager device 400. Data and messages may be transferred between session manager device 400 and another computing device of worker system 106 and/or selection manager device 104 using third communication interface 406. Third computer-readable medium 408 provides the same or similar functionality as that described with reference to computer-readable medium 208 of user device 200 though referring to session manager device 400. Third processor 410 provides the same or similar functionality as that described with reference to processor 210 of user device 200 though referring to session manager device 400.

Referring again to FIG. 4B, fewer, different, and additional components may be incorporated into session worker device 420. Each session worker device 420 of each session of worker system 106 may include the same or different components or combination of components.

Fourth input interface 422 provides the same or similar functionality as that described with reference to input interface 202 of user device 200 though referring to session worker device 420. Fourth output interface 424 provides the same or similar functionality as that described with reference to output interface 204 of user device 200 though referring to session worker device 420. Fourth communication interface 426 provides the same or similar functionality as that described with reference to communication interface 206 of user device 200 though referring to session worker device 420. Data and messages may be transferred between session worker device 420 and another computing device of the associated session of worker system 106 and/or session manager device 400 using fourth communication interface 426. Fourth computer-readable medium 428 provides the same or similar functionality as that described with reference to computer-readable medium 208 of user device 200 though referring to session worker device 420. Fourth processor 430 provides the same or similar functionality as that described with reference to processor 210 of user device 200 though referring to session worker device 420.

Model worker application 432 may be integrated with other analytic tools and may be integrated with model manager application 412 to generate a classification model using training data distributed across the worker computing devices of each session. Model tuning application 222, selection manager application 312, model manager application 412, and/or model worker application 432 may be the same or different applications that are integrated in various manners to identify a first Pareto front set of hyperparameter configurations for a classification model using the training data in a single computing device or a plurality of distributed computing devices. As an example, model tuning application 222, selection manager application 312, model manager application 412, and/or model worker application 432 may be part of an integrated data analytics software application and/or software architecture such as that offered by SAS Institute Inc. of Cary, N.C., USA. For example, Model tuning application 222, selection manager application 312, model manager application 412, and/or model worker application 432 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, model tuning application 222, selection manager application 312, model manager application 412, and/or model worker application 432 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Model tuning application 222, selection manager application 312, model manager application 412, and/or model worker application 432 may be used in a variety of industries. For example, a classification model trained using model tuning application 222, selection manager application 312, model manager application 412, and/or model worker application 432 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Model tuning application 222, selection manager application 312, model manager application 412, and/or model worker application 432 may automatically process data generated as part of operation of an enterprise, facility, system, device, etc., to classify the data and possibly provide a warning or alert associated with the classification using, for example, input interface 202, output interface 204, and/or communication interface 206 so that appropriate action can be initiated in response to the labeling. For example, medical images that include a tumor may be recognized in validation data subset 416 that triggers the sending of a notification message to a clinician that a tumor has been identified based on a "tumor" label determined for the image data.

The training data may be divided into training data subset 434 and validation data subset 436 and/or training data subset 414 and validation data subset 416 in various manners to train and score a classification mode. The training data may include, for example, a plurality of rows and a plurality of columns. The plurality of rows may be referred to as observation vectors or records (observations), and the columns may be referred to as variables. The training data may be transposed. The plurality of variables may define multiple dimensions for each observation vector. An observation vector $x_i$ may include a value for each of the plurality of variables associated with the observation i.

Each variable of the plurality of variables may describe a characteristic of a physical object. For example, if the training data includes data related to operation of a vehicle, the variables may include an oil pressure, a speed, a gear indicator, a gas tank level, a tire pressure for each tire, an engine temperature, a radiator level, etc. The training data may include data captured as a function of time for one or more physical objects. As another example, the training data may include data related to images, where each row includes the pixels that define a single image. The images may be of any item for which image recognition or classification may be performed including, but not limited to, faces, objects, alphanumeric letters, terrain, plants, animals, etc.

The training data may include human labeled (supervised) data that includes a $y_i$-variable (target) value that indicates a truth value related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, the sensor may be medical imaging equipment (i.e., computed tomography image, magnetic resonance image, x-ray image, ultrasound image, etc.), and the training data may include image data captured by the sensor of a body part of a living thing where the image has been classified in some manner, for example, by a domain expert. For example, the image data may indicate existence of a medical condition or non-existence of the medical condition. The training data may include a reference to image data that may be stored, for example, in an image file.

The data stored in the training data may be generated by and/or captured from a variety of sources including one or more sensors of the same or different type, one or more computing devices, etc. The data stored in the training data may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The training data may be stored on third computer-readable medium 408, fourth computer-readable medium 428, and/or on one or more computer-readable media accessible by model manager application 412 using third communication interface 406 and/or third input interface 402 or accessible by model worker application 432 using fourth communication interface 426 and/or fourth input interface 422. Data stored in the training data may be sensor measurements or signal values captured by a sensor such as a camera, may be generated or captured in response to occurrence of an event or a transaction, generated by a device such as in response to an interaction by a user with the device, etc. The data stored in the training data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the training data may be captured at different time points periodically, intermittently, when an event occurs, etc. One or more columns of the training data may include a time and/or date value.

The training data may include data captured under normal operating conditions of the physical object. The training data may include data captured at a high data rate such as 200 or more observations per second for one or more physical objects. For example, data stored in the training data may be generated as part of the Internet of Things (IoT), where things (e.g., machines, devices, phones, sensors) can be connected to networks and the data from these things collected and processed within the things and/or external to the things before being stored in the training data. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the training data.

The training data may be stored using various structures as known to those skilled in the art including one or more files of a file system, a relational database, one or more tables of a system of tables, a structured query language database, etc. Each session manager device 400 may coordinate access to the training data that is distributed across the session worker devices of the associated session that may include zero or more session worker devices. For example, the training data may be stored in a cube distributed across the computing devices of each session that is a grid of computers as understood by a person of skill in the art. As another example, the training data may be stored across the computing devices of each session that form a multi-node Hadoop® cluster. For instance, Apache™ Hadoop® is an open-source software framework for distributed computing supported by the Apache Software Foundation. As another example, the training data may be stored across the computing devices of each session that form a cloud of computers and may be accessed using cloud computing technologies, as understood by a person of skill in the art. The SAS® LASR™ Analytic Server may be used as an analytic platform to enable multiple users to concurrently access data stored in the training data. The SAS® Viya™ open, cloud-ready, in-memory architecture also may be used as an analytic platform to enable multiple users to concurrently access data stored in the training data. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
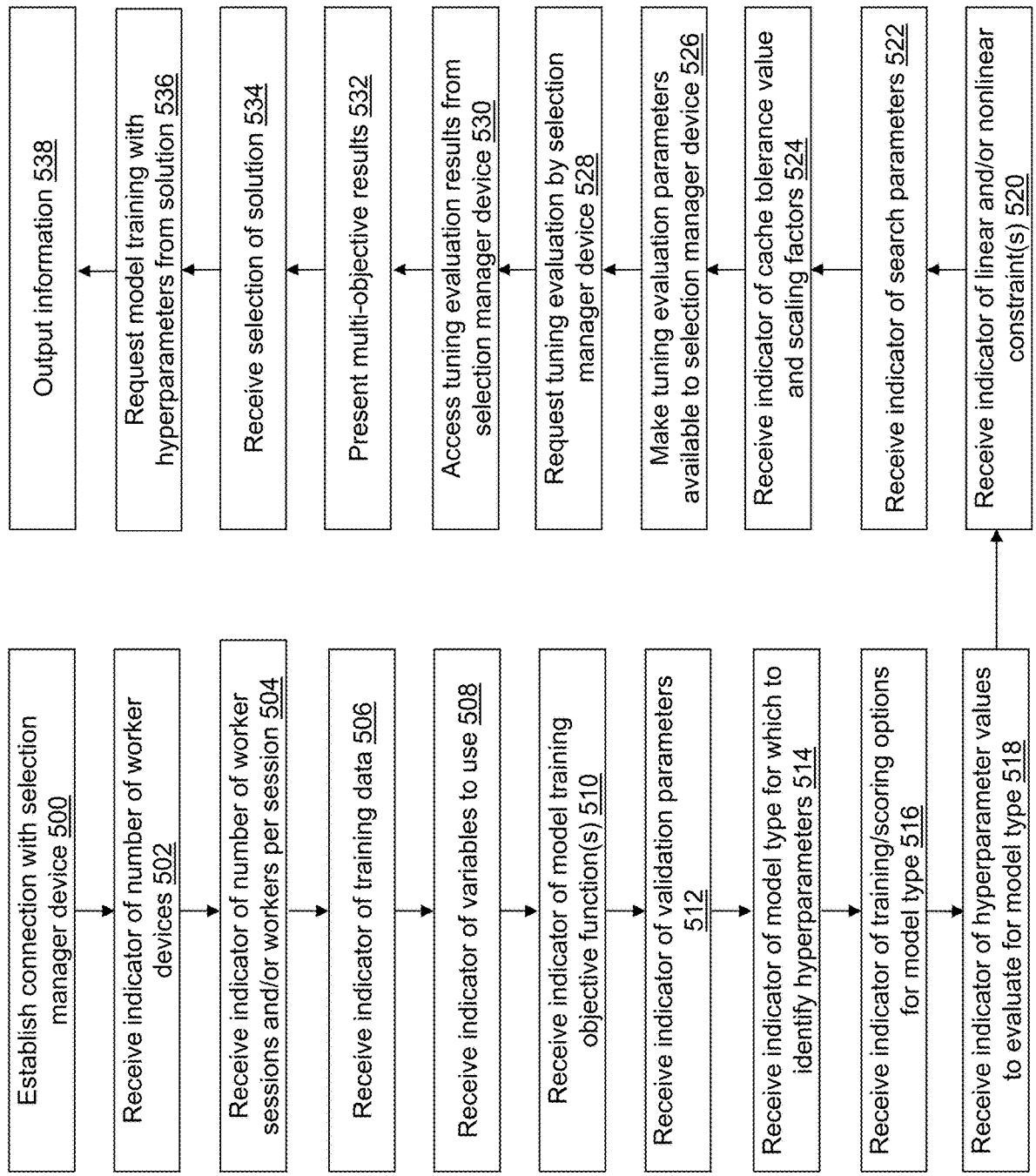
FIG. 5 depicts a flow diagram illustrating examples of operations performed by the user device of FIG. 2 in accordance with an illustrative embodiment.

Referring to FIG. 5, example operations associated with model tuning application 222 are described. Additional, fewer, or different operations may be performed depending on the embodiment. The order of presentation of the operations of FIG. 5 is not intended to be limiting. For example, a user can interact with one or more user interface windows presented to the user in display 216 under control of model tuning application 222 independently or through a browser application in an order selectable by the user. Although some of the operational flows are presented in sequence, the various operations may be performed in various repetitions, concurrently, and/or in other orders than those that are illustrated. For example, a user may execute model tuning application 222, which causes presentation of a first user interface window, which may include a plurality of menus and selectors such as drop-down menus, buttons, text boxes, hyperlinks, etc. associated with model tuning application 222 as understood by a person of skill in the art.

In an operation 500, a connection is established with selection manager device 104. User device 200 accepts commands from a user and relays necessary instructions to selection manager device 104.

In an operation 502, a first indicator may be received that indicates a value of W the number of computing devices or nodes of worker system 106 that may include selection manager device 104 (for example, the same or another indicator may indicate whether or not to include selection manager device 104 or it may or may not be included by default). The first indicator may further indicate whether selection manager device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to selection manager device 104.

Single-machine mode is a computing model in which multiple processors or multiple cores are controlled by a single operating system and can access shared resources, such as disks and memory. Single-machine mode refers to an application running multiple concurrent threads on a multicore machine to take advantage of parallel execution on selection manager device 104. More simply, single-machine mode means multithreading on selection manager device 104. Single-machine mode uses the number of CPUs (cores) on selection manager device 104 to determine the number of concurrent threads. For example, one thread per core may be used though a number of threads on any computing device may be changed under control of the user. A grid host may be specified for a distributed mode and identify a domain name system (DNS) or IP address of selection manager device 104, when selection manager device 104 is a separate device from user device 200.

In an operation 504, a second indicator may be received that indicates the value of $N_s$ the number of the one or more sessions and/or the value of M the number of computing devices included in each session. Within each session, each computing device of that session may also use multiple threads. In an alternative embodiment, the second indicator may not be received. For example, default values may be stored, for example, in computer-readable medium 208 and used automatically. In another alternative embodiment, M or $N_s$ may not be selectable. Instead, a fixed, predefined value may be used. The value(s) further may be automatically determined based on W and other criteria as described further below such that the user does not specify either or only one of $N_s$ the number of the one or more sessions and M the number of computing devices included in each session.

In an operation 506, a third indicator may be received that indicates the training data. For example, the first indicator indicates a location and a name of the training data. As an example, the first indicator may be received by model tuning application 222 after selection from a user interface window or after entry by a user into a user interface window.

In an operation 508, a fourth indicator may be received that indicates a plurality of variables of the training data to define $x_i$. The fifth indicator may indicate that all or only a subset of the variables stored in the training data be used to define model data 318. For example, the fifth indicator indicates a list of variables to use by name, column number, etc. In an alternative embodiment, the fifth indicator may not be received. For example, all of the variables may be used automatically.

In an operation 510, a fifth indicator may be received that indicates one or more objective functions. For example, the fifth indicator indicates a name for each objective function of the one or more objective. Each objective function specifies a measure of model error (performance) to be used to identify a best configuration of the hyperparameters among those evaluated. The twelfth indicator may be received by model tuning application 222 after selection from a user interface window or after entry by a user into a user interface window. A default one or more objective functions may further be stored, for example, in computer-readable medium 208. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the target variable is of a particular type. Of course, the objective function may be labeled or selected in a variety of different manners by the user as understood by a person of skill in the art. In an alternative embodiment, the plurality of objective functions may not be selectable, and a predefined one or more objective functions is implemented in model tuning application 222.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); TAU uses a tau coefficient as the objective function (nominal type only).

The following notation is used to provide a discussion of fit statistics for illustrative objective functions:

$n_o$ is a number of observations in a dataset, r is a number of levels for a nominal target, N is a sum of observation frequencies in the data, $\omega_i$ is a frequency of observation i, so $$N = \sum_{i=1}^{n_o} \omega_i,$$

$y_i$ is a target value of observation i, $\hat{y}_i$ is a predicted target value of observation i, m is a number of target levels, $t_i$ is a level from the target in observation i, $\hat{t}_i$ is a predicted level from the target in observation i, $y_{i,j}=1$ if observation i is assigned to target level j, otherwise $y_{i,j}=0$, $p_{i,j}$ is a predicted probability that observation i is assigned to target level j, $m_{tc}$ is a number of total cutoff points, $a_k$ is a true positive at a cutoff point k, $b_k$ is a false positive at the cutoff point k, $c_k$ is a false negative at the cutoff point k, $$\theta = \sum_{k=1}^{m_{tc}} (a_{k-1} - a_k)(b_{k-1} - b_k),$$

$$\mu = \sum_{k=2}^{m_{tc}} \left( (a_{k-1} - a_k) \sum_{j=1}^{k} (b_{j-1} - b_j) \right),$$

-continued $$w = \sum_{k=1}^{m_{tc}} \left( (a_{k-1} - a_k) \sum_{j=k+1}^{m_{tc}} (b_{j-1} - b_j) \right),$$

$\rho = a_0 b_0,$ $a_{m_{tc}} = 0,$ $b_{m_{tc}} = 0,$ $p = a_k / (a_k + b_k),$ $q = a_k / (a_k + c_k),$ and $\beta = 0.5.$ For interval targets, illustrative objective functions may be defined as:

$$ASE = \frac{1}{N} \sum_{i=1}^{n_o} \omega_i (y_i - \hat{y}_i)^2,$$

$$RASE = \sqrt{ASE},$$

$$MSLE = \frac{1}{N} \sum_{i=1}^{n_o} \omega_i (\log(\hat{y}_i + 1) - \log(y_i + 1))^2,$$

$$RMSLE = \sqrt{MSLE},$$

$$MAE = \frac{1}{N} \sum_{i=1}^{n_o} \omega_i |y_i - \hat{y}_i|, \text{ or}$$

$$RMEA = \sqrt{MAE}.$$

For nominal targets, illustrative objective functions may be defined as:

$$ASE = \frac{1}{rN} \sum_{i=1}^{n_o} \sum_{j=1}^{m} \omega_i (y_{i,j} - p_{i,j})^2,$$

$$RASE = \sqrt{ASE},$$

$$MCE = \frac{1}{N} \sum_{t_i \neq \hat{t}_i} \omega_i, \text{ or}$$

$$MCLL = -\frac{1}{N} \sum_{i=1}^{n_o} \sum_{j=1}^{m} \omega_i y_{i,j} \log p_{i,j}.$$

Additional illustrative objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TUA = \frac{\mu - w}{N/2(N-1)}, \text{ and}$$

$$F05 = \frac{(1 + \beta^2)pq}{\beta^2 p + q}.$$

In an operation 512, a sixth indicator may be received that provides validation parameters that describe a validation process to be used by each session of worker system 106. For example, the sixth indicator may include a fraction value for a fraction of the training data to be used for validation or the number of folds F for cross-validation. In an alternative embodiment, the sixth indicator may not be received. For example, a default value may be stored, for example, in computer-readable medium 208 and used automatically. In another alternative embodiment, a fixed, predefined value may be used for the fraction value unless the number of folds F is defined by the user. In cross validation, each model evaluation requires F−1 number of training executions and scoring executions with different training subsets as discussed previously. Thus, the evaluation time is increased by approximately a factor of F−1. For small to medium sized training datasets or for unbalanced training datasets, cross validation provides on average a better representation of error across the entire training dataset.

In an operation 514, a seventh indicator of a model type for which to identify a best hyperparameter configuration may be received. For example, the seventh indicator indicates a name of a model type. The seventh indicator may be received by model tuning application 222 after selection from a user interface window or after entry by a user into a user interface window. As an example, a model type may be selected from "Decision Tree", "Factorization Machine", "Forest", "Gradient Boosting Tree", "Neural Network", "Support Vector Machine", etc. Of course, the model type may be labeled or selected in a variety of different manners by the user as understood by a person of skill in the art. In an alternative embodiment, the model type may not be selectable, and a single model type is implemented in model tuning application 222.

The Decision Tree model type automatically adjusts decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecision Tree action, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The Forest model type automatically adjusts forest hyperparameters to tune a Forest model for minimum error as measured by a specified objective function. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning 8.5 may be used to implement the forest model type in SAS® Viya™ developed and provided by SAS Institute Inc. of Cary, N.C., USA. The FOREST procedure creates a predictive model called a forest, which consists of several decision trees in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target when it forms a splitting rule. The FOREST procedure creates an ensemble of decision trees to predict a single target of either interval or nominal measurement level. An input variable can have an interval or nominal measurement level.

For illustration, an "autotune" statement used with the FOREST procedure included in SAS® Visual Data Mining and Machine Learning 8.5 may be used to evaluate different hyperparameter configurations and to select the best configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS Viya™ and SAS® Cloud Analytic Services (CAS) developed and provided by SAS Institute Inc. of Cary, N.C., USA.

The Factorization Machine model type automatically adjusts factorization machine parameters to tune a factorization machine model for minimum error as measured by a specified objective function. For illustration, a FACTMAC procedure included in SAS® Visual Data Mining and Machine Learning 8.5 may be used to implement the factorization machine model type in SAS® Viya™ all developed and provided by SAS Institute Inc. of Cary, N.C., USA. The Factorization Machine model type generalizes a matrix factorization. The FACTMAC procedure estimates factors for each of the nominal input variables specified, in addition to estimating a global bias and a bias for each level of the nominal input variables. An interval target variable is also specified. The FACTMAC procedure computes the biases and factors by using a stochastic gradient descent (SGD) algorithm that minimizes a root mean square error (RMSE) criterion.

For illustration, an "autotune" statement used with the FACTMAC procedure included in SAS® Visual Data Mining and Machine Learning 8.5 may be used to evaluate different hyperparameter configurations and to select the best configuration of hyperparameter values for the Factorization Machine model type. A tuneFactmac action selects different hyperparameter configurations to run the factmac action of the factmac action set, the score action of the astore action set, and the assess action of the percentile action set to train and validate factorization machine models as it searches for a model that has reduced validation error. For illustration, the factmac action, the score action, and the assess action are included in SAS® Viya™ and SAS® Cloud Analytic Services (CAS) developed and provided by SAS Institute Inc. of Cary, N.C., USA.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.5 may be used to implement the Gradient Boosting Tree model type in SAS® Viya™ all developed and provided by SAS Institute Inc. of Cary, N.C., USA. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.5 may be used to evaluate different hyperparameter configurations and to select the best configuration of hyperparameter values for the Gradient Boosting Tree model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in the decisionTree action set of SAS® Viya™ and SAS® Cloud Analytic Services (CAS) developed and provided by SAS Institute Inc. of Cary, N.C., USA.

The Neural Network model type automatically adjusts neural network parameters to tune a neural network model for minimum error as measured by a specified objective function. For illustration, a NNET procedure included in SAS® Visual Data Mining and Machine Learning 8.5 may be used to implement the Neural Network model type in SAS® Viya™ all developed and provided by SAS Institute Inc. of Cary, N.C., USA. The NNET procedure trains a multilayer perceptron neural network. Training a multilayer perceptron neural network relies on an unconstrained minimization of a nonlinear objective function.

For illustration, an "autotune" statement used with the NNET procedure included in SAS® Visual Data Mining and Machine Learning 8.5 may be used to evaluate different hyperparameter configurations and to select the best configuration of hyperparameter values for the neural network model type. A tuneNeuralNet action selects different hyperparameter configurations to run the annTrain and annScore actions multiple times to train and validate neural network models as it searches for a model that has reduced validation error. For illustration, the annTrain and annScore actions are included in the neura/Net action set of SAS Viya™ and SAS® Cloud Analytic Services (CAS) developed and provided by SAS Institute Inc. of Cary, N.C., USA.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.5 may be used to implement the Support Vector Machine model type in SASViya™ all developed and provided by SAS Institute Inc. of Cary, N.C., USA. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.5 may be used to evaluate different hyperparameter configurations and to select the best configuration of hyperparameter values for the support vector machine model type. A tuneSvm action selects different hyperparameter configurations to run the svmTrain action of the svm action set, the score action of the astore action set, and the assess action of the percentile action set to train and validate support vector machine models as it searches for a model that has reduced validation error. For illustration, the svmTrain action is included in the svm action set of SAS® Viya™ and SAS® Cloud Analytic Services (CAS) developed and provided by SAS Institute Inc. of Cary, N.C., USA.

In an operation 516, an eighth indicator may be received that defines values for one or more variables associated with training the selected model type and/or values for one or more variables associated with scoring the selected model type.

In an operation 518, a ninth indicator may be received that defines values for one or more of the hyperparameters to evaluate based on the selected model type. Using the ninth indicator, the user may identify one or more of the hyperparameters to exclude from the evaluation such that a single value is used for that hyperparameter when selecting values for each hyperparameter configuration. When a hyperparameter is excluded, a default value defined for the hyperparameter may be used for each hyperparameter configuration. Using the ninth indicator, the user may select one or more of the hyperparameters to evaluate using a lower bound value, an upper bound value, and an iteration value and/or a specific value instead of the default value. Using the ninth indicator, the user may identify one or more of the hyperparameters to evaluate using a list of possible values instead of a range of default values. Using the ninth indicator, the user may identify one or more of the hyperparameters to evaluate using default bounds and initial values.

For example, the decision tree model type hyperparameters may include a maximum number of decision tree levels (maxLevel), a number of bins to use for numeric variables during calculation of the decision tree (nBins), and a split criterion for each tree node (crit). A value for each of these hyperparameters is defined in each hyperparameter configuration for the decision tree model type. The methodology by which the values are determined is based on the tuning search method discussed further below and the values, if any, indicated in operation 518.

For example, the factorization machine model type hyperparameters may include a number of factors (nFactors), a learning step (learnStep), and a maximum number of iterations (maxIter). A value for each of these hyperparameters is defined in each hyperparameter configuration for the factorization machine model type. The methodology by which the values are determined is based on the tuning search method discussed further below and the values, if any, indicated in operation 518.

For example, the forest model type hyperparameters may include a fraction (bootstrap) of a random bootstrap sample of the training data to be used for growing each tree in the forest, where the fraction is a value between 0 and 1 with a default value of 0.6. The forest model type hyperparameters further may include a maximum depth (maxLevel) of a decision tree to be grown where a number of levels in a tree is equal to a depth value plus one. A default value for the maximum depth may be 20. The forest model type hyperparameters further may include a number of trees (nTree) to grow, which by default may be equal to 100. The forest model type hyperparameters further may include a number of input variables (m) to consider splitting on in a node, where the value is between one and a number of input variables with a default value equal to a square root of the number of input variables. A value for each of these hyperparameters is defined in each hyperparameter configuration for the forest model type. The methodology by which the values are determined is based on the tuning search method discussed further below and the values, if any, indicated in operation 518.

For example, the gradient boosting tree model type hyperparameters may include an L1 norm regularization parameter (lasso) that is greater than or equal to zero with a default value of zero. The gradient boosting tree model type hyperparameters further may include a learning rate (learningRate) that is between zero and one, inclusive, with a default value of 0.1. The gradient boosting tree model type hyperparameters further may include a number of trees (nTree) to grow with a default value of 100. The gradient boosting tree model type hyperparameters further may include an L2 norm regularization parameter (ridge) that is greater than or equal to zero with a default value of zero. The gradient boosting tree model type hyperparameters further may include a fraction (subSampleRate) of the training data to be used for growing each tree with a default value of 0.5. The gradient boosting tree model type hyperparameters further may include a number of input variables (m) to consider splitting on in a node where the value is between one and a number of input variables with a default value equal to the number of input variables. A value for each of these hyperparameters is defined in each hyperparameter configuration for the gradient boosting tree model type. The methodology by which the values are determined is based on the tuning search method discussed further below and the values, if any, indicated in operation 518.

For example, the neural network model type hyperparameters may include a range of an annealing rate (annealingRate) to use when a stochastic gradient descent (SGD) algorithm is used for training. The neural network model type hyperparameters further may include a learning rate (learningRate) when the SGD algorithm is used for training. The neural network model type hyperparameters further may include a number of hidden layers (nHidden) in the network between zero and five with a default value of two. The neural network model type hyperparameters further may include tuning information for neurons in the ith hidden layer, where i is any integer between one and five, inclusive. The neural network model type hyperparameters further may include an L1 norm regularization parameter (regL1) that is greater than or equal to zero with a default value of zero. The neural network model type hyperparameters further may include an L2 norm regularization parameter (regL2) that is greater than or equal to zero with a default value of zero. A value for each of these hyperparameters is defined in each hyperparameter configuration for the neural network model type. The methodology by which the values are determined is based on the tuning search method discussed further below and the values, if any, indicated in operation 518.

For example, the support vector machine model type hyperparameters may include a penalty value C that is greater than zero. The support vector machine model type hyperparameters further may include a degree value (degree) that can be between one and three, inclusive. The degree value equal to one is used in a linear kernel. The degree value equal to two or three is used in a polynomial kernel. A value for each of these hyperparameters is defined in each hyperparameter configuration for the support vector machine model type. The methodology by which the values are determined is based on the tuning search method discussed further below and the values, if any, indicated in operation 518.

Table 1 below summarizes the hyperparameters for each model type and the default values or range of values used unless different values are indicated in operation 518:

TABLE 1

| Hyperparameter | Initial Value | Lower Bound | Upper Bound |
|---|---|---|---|
| Decision Tree (PROC TREESPLIT) | | | |
| MAXDEPTH | 10 | 1 | 19 |
| NUMBIN | 20 | 20 | 200 |
| CRITERION | GAIN (nominal target) VARIANCE (interval target) | GAIN, IGR, GINI, CHISQUARE, CHAID (nominal target) VARIANCE, FTEST, CHAID (interval target) | |
| Forest (PROC FOREST) | | | |
| NTREES | 100 | 20 | 150 |
| VARS_TO_TRY | sqrt(# inputs) | 1 | # inputs |
| INBAGFRACTION | 0.6 | 0.1 | 0.9 |
| MAXDEPTH | 20 | 1 | 29 |
| Gradient Boosting Tree (PROC GRADBOOST) | | | |
| NTREES | 100 | 20 | 150 |
| VARS_TO_TRY | # inputs | 1 | # inputs |
| LEARNINGRATE | 0.1 | 0.01 | 1.0 |
| SAMPLINGRATE | 0.5 | 0.1 | 1.0 |
| LASSO | 0.0 | 0.0 | 10.0 |
| RIDGE | 0.0 | 0.0 | 10.0 |
| Neural Network (PROC NNET) | | | |
| NHIDDEN | 0 | 0 | 5 |
| NUNITS1, . . . , 5 | 1 | 1 | 100 |
| REGL1 | 0 | 0 | 10.0 |
| REGL2 | 0 | 0 | 10.0 |
| LEARNINGRATE | 1E-3 | 1E-6 | 1E-1 |
| ANNEALINGRATE | 1E-6 | 1E-13 | 1E-2 |
| Support Vector Machine (PROC SVMACHINE) | | | |
| C | 1.0 | 1E-10 | 100.0 |
| DEGREE | 1 | 1 | 3 |
| Factorization Machine (PROC FACTMAC) | | | |
| NFACTORS | 5 | 5, 10, 15, 20, 25, 30 | |
| MAXITER | 30 | 10, 20, 30, . . . , 200 | |
| LEARNSTEP | 1E-3 | 1E-6, 1E-5, 1E-4, 1E-3, 1E-2, 1E-1, 1.0 | |

For illustration, a syntax for specifying custom definitions of hyperparameters to tune is TUNINGPARAMETERS= (<suboption> <suboption> . . . ) where each <suboption> is specified as: <hyperparameter name> (LB=LB_number UB=UB_number VALUES=value-list INIT=INIT_number EXCLUDE), where LB_number indicates a lower bound value that overrides the default lower bound value, UB_number indicates an upper bound value that overrides the default upper bound value, value-list indicates a list of values to try, INIT_number indicates an initial value to use in training a baseline model, and EXCLUDE indicates whether or not to exclude the hyperparameter from the tuning evaluation by using a fixed value specified for the hyperparameter or the default value if none is specified.

In an operation 520, a tenth indicator may be received that indicates one or more linear constraints and/or one or more nonlinear constraints. Linear constraints may be defined based on $b_l \leq Ah \leq b_u$, and non-linear constraints may be defined based on $c_l \leq c(h) \leq c_u$, where h is a vector defined from the hyperparameters of the selected machine learning model type, $b_l$ is a vector of lower bounds defined for each linear constraint, A is a matrix in $\mathbb{R}^{N_v \times k}$ defining linear constraints, $N_v$ is a number of the hyperparameters of the selected machine learning model type, k is k is the number of the linear constraints, $b_u$ is a vector of upper bounds defined for each linear constraint, $c_l$ is a vector of lower bounds defined for each nonlinear constraint, c(h) is a list of nonlinear constraint functions c: $\mathbb{R}^{N_v} \rightarrow \mathbb{R}^m$, m is the number of the nonlinear constraints, and $c_u$ is a vector of upper bounds defined for each nonlinear constraint. A nonlinear constraint function c(h) may be based on an objective function value $f(h)$ of the one or more objective functions computed based on h such that $c(h)=f(h)$.

For example, given a selected hyperparameter configuration, a linear constraint value is computed with one or more hyperparameter values defined by the selected hyperparameter configuration, and the computed linear constraint value is compared to a linear constraint boundary value based on an inequality to ensure it is within the linear constraint boundary. For example, given the linear constraint $3 < 23h_1$, where $h_1$ is a hyperparameter value of a hyperparameter included in the selected hyperparameter configuration, the linear constraint value is $23h_1$, the linear constraint boundary value is 3, and the inequality of "greater than" are defined. The linear constraint value must be greater than the linear constraint boundary value for the selected hyperparameter configuration to be linearly feasible. If it is not, the selected hyperparameter configuration is linearly infeasible.

In an operation 522, an eleventh indicator may be received that defines values for one or more search parameters associated with a tuning search method. For example, a maximum number of configuration evaluations $n_b$, a population size $n_p$, a number of centers $n_c$, an initial step size value $\Delta$, a decrease criterion value $\alpha \in (0,1)$, a maximum number of iterations $M_{xi}$, a maximum time $M_{xt}$, etc. may be defined by the eleventh indicator. Table 2 below summarizes illustrative default and allowed values for one or more search parameters:

TABLE 2

| Option | Default Value | Allowed Values |
|---|---|---|
| $n_b$ | 50 | [3 – ∞] |
| $n_p$ | 10 | [2 – ∞] |
| $n_c$ | $2 * N_v$ | 0 or $2 * N_v$ |
| $\Delta$ | 1 | 1 |
| $\alpha$ | 0.5 | 0.5 |
| $M_{xi}$ | 5 | [1 – ∞] |
| $M_{xt}$ | 36,000 | [1 – ∞] |

In an operation 524, a twelfth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the twelfth indicator may not be received. For example, default value may be stored, for example, in computer-readable medium 208 and used automatically. An illustrative default value for the cache tolerance value is 1e-9. An illustrative default value for the scaling factor value for each hyperparameter is one. In another alternative embodiment, the cache tolerance value and the scaling factor value for each hyperparameter may not be selectable. Instead, fixed, predefined values may be used.

The tuning search method may be "LHS+GA/GSS" in which a Latin hypercube sampling (LHS) search method is used to generate a first set of hyperparameter configurations that are each executed to generate an objective function value for each selected objective function. The objective function values and the hyperparameter configuration associated with each are used to initialize a genetic search method (GA). Each population of the GA search method may be enhanced with a "growth step" in which a generating set search (GSS) search method is used to locally improve a promising member of the GA population.

For illustration, the LHS search method generates uniform hyperparameter values across the range of each hyperparameter and randomly combines them across hyperparameters. If the hyperparameter is continuous or discrete with more levels than a requested sample size, a uniform set of samples is taken across the hyperparameter range including a lower bound and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. The LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS method is designed for problems that have continuous variables and have the advantage that, in practice, they often require significantly fewer evaluations to converge than does a GA search method. Furthermore, a GSS method can provide a measure of local optimality that is very useful in performing multimodal optimization. The GSS method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer variables to their current setting. These additional growth steps may be performed each iteration to permit selected hyperparameter configurations of the population (based on diversity and fitness) to benefit from local optimization over the continuous variables.

In an operation 526, the tuning evaluation parameters that may include the parameters indicated in operations 502 to 524 are made available to selection manager device 104. For example, the values of any of the parameters that are not default values may be sent to selection manager device 104. As another option, a location of the values of any of the parameters that are not default values may be sent to selection manager device 104. As still another option, a location of the values of any of the parameters that are not default values may be provided to selection manager device 104 in a computer memory location that is known to selection manager device 104.

In an operation 528, a tuning evaluation to identify a first Pareto front set of hyperparameter configurations based on the one or more linear and/or nonlinear constraints is requested of selection manager device 104 using the tuning evaluation parameters.

In an operation 530, tuning evaluation results are accessed. For example, an indicator may be received that indicates that the tuning process is complete. For example, one or more output tables may be presented on display 216 when the tuning process is complete. As another option, display 216 may present a statement indicating that the tuning process is complete. The user can access the output tables in the specified location.

In an operation 532, the multi-objective results are presented to the user that shows the first Pareto front set of objective function values and their associated hyperparameter configuration.

Figure 8:
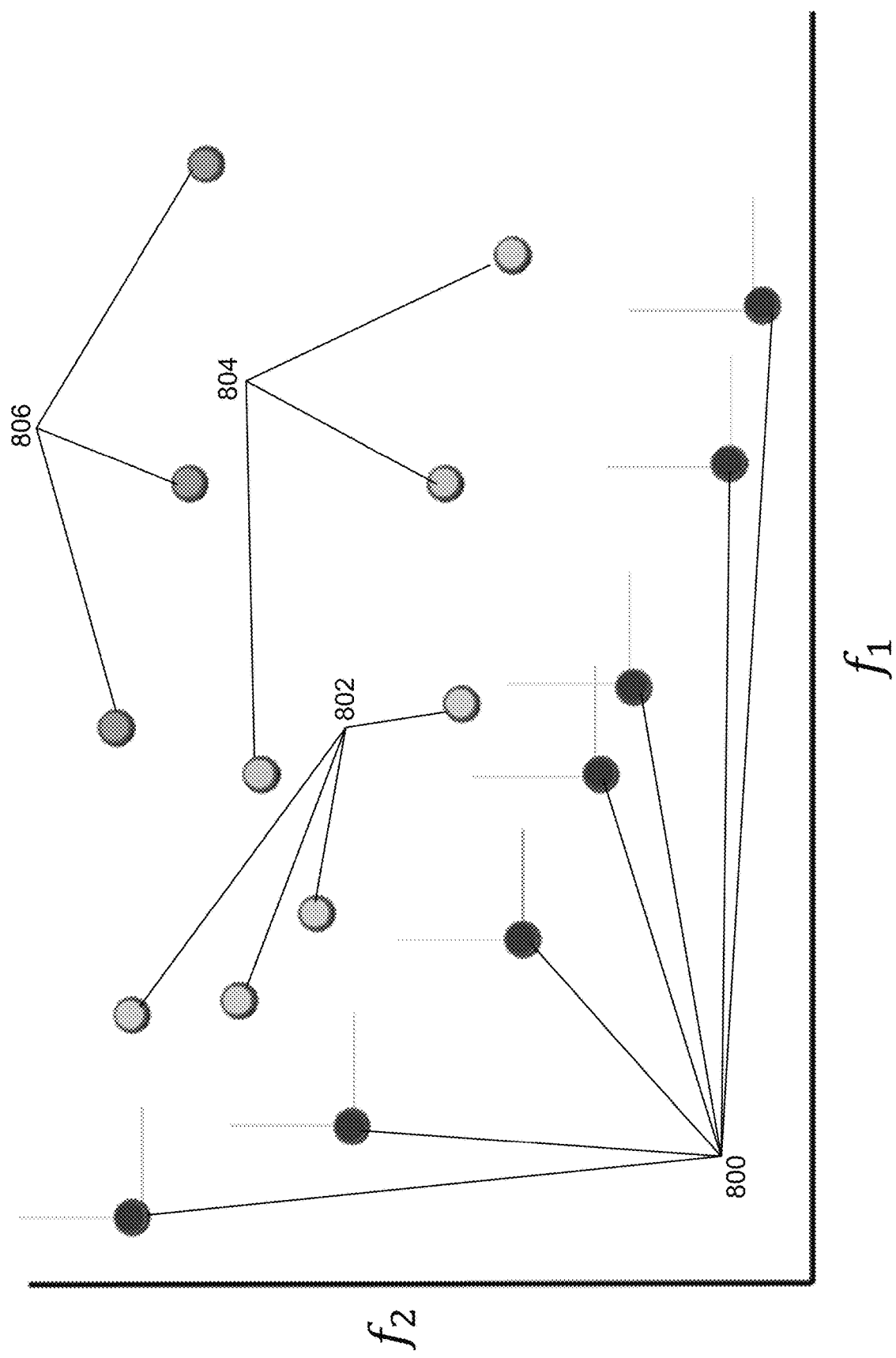
FIG. 8 illustrates a four Pareto front sets in accordance with an illustrative embodiment.

In an operation 534, a selected multi-objective solution is received based on selection by the user from the multi-objective results. For illustration, referring to FIG. 8, a first Pareto front set of objective function values 800, a second Pareto front set of objective function values 802, a third Pareto front set of objective function values 804, and a fourth Pareto front set of objective function values 806 are shown. The user can select the multi-objective solution from first Pareto front set of objective function values 800 based on balancing the values of two objective functions $c_1(h)=f_1(h)$ and $c_2(h)=f_2(h)$. A hyperparameter configuration is associated with the selected multi-objective solution. The hyperparameter configuration defines a hyperparameter value for each hyperparameter.

Referring again to FIG. 5, in an operation 536, training of a model using the hyperparameter configuration associated with the selected multi-objective solution is requested of selection manager device 104. For example, an indicator of the selected multi-objective solution or of the hyperparameter configuration associated with the selected multi-objective solution is included with the request.

In an operation 538, output information is output. For example, the output information may be presented on display 216 when the training process is complete. As another option, display 216 may present a statement indicating that the training process is complete. the selected hyperparameters may be used to train the selected model type for input dataset 1524 (shown referring to FIG. 15). In addition, or in the alternative, the selected hyperparameters may be used to predict classifications for input dataset 1524 with selected model data 320. The output information may include one or more tables created by default in a default location automatically or based on a user selection. Example tables include a "Tuner Information" output table that summarizes values of options specified by the user to control execution of model tuning application 222; a "Tuner Results" output table that includes a default configuration and up to ten of the best hyperparameter configurations (based on an extreme (minimum or maximum) objective function value) identified, where each configuration listed includes the hyperparameter values and objective function value for comparison; a "Tuner Evaluation History" output table that includes all of the hyperparameter configurations evaluated, where each configuration listed includes the hyperparameter values and objective function value for comparison; a "Best Configuration" output table that includes values of the hyperparameters and the objective function value for the best configuration identified; a "Tuner Summary" output table that includes statistics about execution of the tuning process; a "Tuner Task Timing" output table that includes timing information about the different tasks performed during the tuning process; and a trained model output that includes information to execute the model generated using the training data with a selected hyperparameter configuration. For example, the trained model output includes information to execute the model generated using the training data with the selected hyperparameter configuration that may be saved in selected model data 320 and used to classify an input dataset 1524 (shown referring to FIG. 15) as discussed further below. For illustration, selected model data 320 may be stored using the SAS ASTORE format developed and provided by SAS Institute Inc. of Cary, N.C., USA for faster in-memory scoring. The other output tables may be stored in model data 318 or another location as specified by the user. For example, one or more of the output tables may be selected by the user for presentation on display 216.

Referring to FIGS. 6A to 6D, example operations associated with selection manager application 312 are described. Additional, fewer, or different operations may be performed depending on the embodiment. The order of presentation of the operations of FIGS. 6A to 6D is not intended to be limiting. Selection manager device 104 establishes communication with the computing devices of worker system 106, sends instructions to each session manager device 400 associated with each session established by selection manager device 104, collects and aggregates the results of computations from each session, and communicates final results to user device 200. Selection manager device 104 may utilize itself as a worker computing device of worker system 106. The computing devices of worker system 106 receive instructions from selection manager device 104, store and process data, and send the results of computations back to selection manager device 104 under control of session manager device 400 associated with each session. The worker computing devices of each session may also communicate to each other directly to complete tasks.

In an operation 600, tuning evaluation parameters obtained by model tuning application 222 are accessed. For example, values for parameters indicated in operations 502 to 524 and made available to selection manager device 104 in operation 526 are accessed.

In an operation 602, the number of workers per session M and the number of sessions $N_s$ are determined. For example, when the second indicator specifies $N_s$, that value is used for the number of sessions, or when the second indicator specifies M, that value is used for the number of workers per session. If W is equal to all of the workers that are connected to selection manager device 104 and there are at least 16 worker computing devices included in worker system 106, $N_s$ may be limited to eight so that the number of workers per session M is at least two.

Optionally, the second indicator may indicate that M is set based on a size of the training data. For example, M may be set based on a number of rows r and a number of columns c of the training data and a distribution factor d. For illustration, M=1+rcd. An illustrative value of $d=2e^{-8}$ may be used so that another session worker device 420 is added to each session for every 50 million data values. The value of d may be selected by a user of user device 200. The number of columns c further may be the number of variables to use instead of a total number of columns.

$N_s$ may be determined as either one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of $N_s$. For the LHS tuning search method, $N_s$ may be determined as one less than a sample size. $N_s$ may then be limited by a configuration of selection manager device 104. When selection manager device 104 is configured in single-machine mode and $N_s$ is greater than four and not specified by the second indicator, $N_s$ is limited to four. When selection manager device 104 is configured in single-machine mode and $N_s$ is specified by the second indicator, $N_s$ may be limited to 32 or a number of threads of selection manager device 104. When selection manager device 104 is configured in distributed mode, and $N_s$ is not specified by the second indicator, $N_s \leq W/M$ may be used. When selection manager device 104 is configured in distributed mode and $N_s$ is specified by the second indicator, $N_s \leq 2W/M$ may be applied.

For illustration, if a population size specified for the GA search method is ten, even if W=100 and M=2 based on a size of the training data, $N_s=10$ instead of $N_s=50$ because the GA population size (number of hyperparameter configurations created each iteration by the GA search method) limits the number of hyperparameter configurations created each iteration.

When $N_s$ is greater than one and M is equal to one, selection manager application 312 is executed in a model parallel mode; when M is greater than one and $N_s$ is equal to one, selection manager application 312 is executed in a data parallel mode; and when both M and $N_s$ are greater than one, selection manager application 312 is executed in a data and model parallel mode. In an automatic mode, $N_s$ may be selected to be as large as possible with M as small as possible subject to the size of the training data because model parallel is more efficient than data parallel.

In an operation 604, the number of sessions $N_s$ are created to include the number of workers per session M with session manager device 400 selected for each created session. A portion of the training data is distributed across the computing devices of each session into training data subset 414 and/or training data subset 434. A portion of the training data is further distributed across the computing devices of each session into validation data subset 416 and/or validation data subset 436. For example, validation data subset 416 and/or validation data subset 436 may be randomly selected from the training data based on the validation parameters indicated in operation 512. A remainder of the training data may be randomly allocated from the training data into training data subset 414 and/or training data subset 434 distributed across the computing devices of each session.

A thread is allocated from an available thread pool to each created session. The allocated threads each manage the communications between selection manager device 104 and each session manager device 400.

A data structure is created for each session through which each session is notified of the training data, of the hyperparameter values for the assigned hyperparameter configuration, of the model type to train and score, of other input values for the model type, etc. An illustrative data structure includes a thread identifier that links the data structure to each thread, a session handle for the thread, a parameter list for training with the model type, a data filter for the training dataset based on whether the training mode is using cross validation or a single partition, the hyperparameter values assigned to the thread, a pruning parameter list when a decision tree model type is used, a parameter list for scoring with the model type, a data filter for the validation dataset based on whether the training mode is using cross validation or a single partition, a training time, a scoring time, a total time, a format link, a completion indicator, a number of folds completed indicator, and an extension for reading results. The session handle contains information about the session that was started in a new process to run actions.

In an operation 605, a session is selected to execute a baseline hyperparameter configuration used as a baseline. The baseline hyperparameter configuration may be associated with an iteration zero. The data structure associated with the selected session is loaded with the baseline hyperparameter configuration. For example, the parameter list for training with the model type, the data filter for the training data, the default or baseline hyperparameter values, optionally the pruning parameter list, the parameter list for scoring with the model type, and the data filter for validation data are defined in the data structure linked to the selected session. The selected session is requested to execute the baseline hyperparameter configuration based on the parameter values in the data structure. The handle to the session process stored in the data structure associated with the selected session may be used to make this request or call. First objective function values are obtained by using either single partition validation or k-fold cross validation depending on the user validation selection.

In an operation 606, results generated from the baseline hyperparameter configuration $h_b$ are accessed. For example, the results may be received from the selected session or accessed in a global table, etc. The extension pointer stored in the data structure associated with the selected session is a pointer to a set of utility functions that support parsing of tabular results created by actions in an internal format. The first objective function values $f(h_b)$ may be extracted from an in-memory table created by an action called for validation of the trained model. The results may be extracted from an in-memory "blob" and converted to tabular form using the extension pointer.

In an operation 607, the baseline hyperparameter configuration $h_b$ and the first objective function values $f(h_b)$ are added to evaluation cache 314.

In an operation 608, a first configuration list P is defined using LHS and its associated parameters, and an iteration counter $N_k$ is initialized to $N_k=1$. The first configuration list includes a plurality of hyperparameter configurations $P=\{h_{N_k,1}, h_{N_k,2}, \ldots h_{N_k,n_p}\}$ where each hyperparameter configuration includes a value for each hyperparameter to evaluate based on the model type indicated in operation 514, and $n_p$ is a number of hyperparameter configurations included in the first configuration list. A set of hyperparameter configurations includes a plurality of hyperparameter configurations selected for evaluation before a next set of hyperparameter configurations is selected for evaluation based on the tuning search method and the objective function values computed for each hyperparameter configuration.

Figure 7:
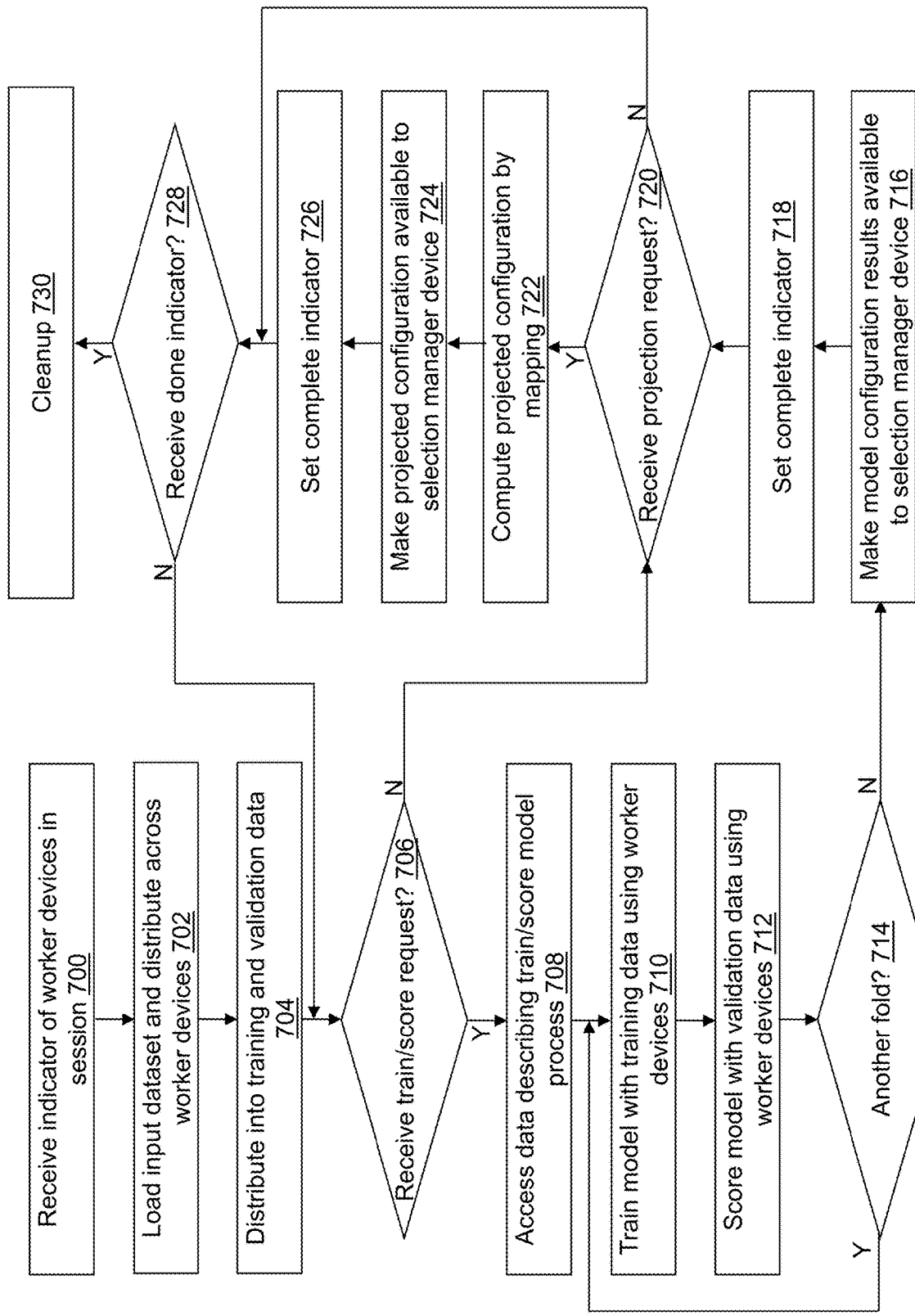
FIG. 7 depicts a flow diagram illustrating examples of operations performed by the session manager/worker device of FIGS. 4A and 4B in accordance with an illustrative embodiment.

In an operation 609, a single hyperparameter configuration such as is selected from the first configuration list and assigned to each created session by loading the values in the data structure associated with the selected session. For example, $h_{N_k,1}$ may be assigned to a first session; $h_{N_k,2}$ may be assigned to a second session; and so on. Depending on the number of created sessions $N_s$ relative to the number of hyperparameter configurations $n_p$ included in the first configuration list, all of the configurations defined in the first configuration list may be assigned or less than all of the configurations may be assigned. Each session is requested to execute its assigned hyperparameter configuration based on the hyperparameter values in the data structure. The handle to the session process stored in the data structure associated with the selected session may be used to make this request or call. FIG. 7 describes the operations performed by each session in response to the request.

In an operation 610, a determination is made concerning whether any execution is done. For example, session manager device 400 may set the completion indicator to indicate done in the data structure associated with it. If no execution is done, processing continues in operation 610 until indication that a session is done is received. If any execution is done, processing continues in an operation 612. For illustration, selection manager device 104 loops through each of its thread handles, checking to see if that particular thread is busy or available. When a session finishes evaluating its assigned hyperparameter configuration, session manager device 400 returns the computed values such as for $f(h_a)$, where $h_a$ indicates the assigned hyperparameter configuration that is one of $h=\{h_{N_k,1}, h_{N_k,2}, \ldots h_{N_k,n_p}\}$, back to selection manager device 104 and sets its completion indicator indicating that it is available to receive a new hyperparameter configuration for evaluation.

In operation 612, results from the configuration execution are accessed in association with the hyperparameter configuration values defined for the configuration assigned to the session that has completed its computations. For example, an objective function value for each objective function of the plurality of objective functions indicated in operation 524 may be accessed using the data structure.

In an operation 614, the results including the objective function values $f(h_a)$ computed from execution of the assigned hyperparameter configuration values are stored in evaluation cache 314 and in model data 318 in association with $h_a$. A successive configuration execution number and the iteration counter $N_k$ may further be stored in model data 318 in association with the objective function values $f(h_a)$.

In an operation 616, a determination is made concerning whether the first configuration list includes another hyperparameter configuration to evaluate that has not been assigned to a session. If the first configuration list includes another hyperparameter configuration to evaluate, processing continues in an operation 618. If the first configuration list does not include another hyperparameter configuration to evaluate, processing continues in an operation 620.

In operation 618, a next hyperparameter configuration is selected from the first configuration list and assigned to the now available session, the data structure associated with the now available session is updated to include the next assigned hyperparameter configuration. A request is sent to session manager device 400 associated with the now available session to execute model manager application 412 with the hyperparameter configuration included in the data structure, and processing continues in operation 610 to continue to monitor for sessions that have completed their assigned hyperparameter configuration evaluation.

In operation 620, a GA search instance and a number of GSS instances are created and initialized where the number of GSS instances is the number of search centers $n_c=2*N_v$.

In an operation 622, a desirability function is generated for each created GSS instance. Using the first configuration list P of hyperparameter configurations and the objective function values $f_i(h)$, $i=1, \ldots, N_{obj}$ associated with each hyperparameter configuration indicated by p, minimum and maximum objective functions are defined as $$(f_{min})_i = \min_{h \in P} f_i(h), i = 1, \ldots, N_{obj}$$

$$(f_{max})_i = \max_{h \in P} f_i(h), i = 1, \ldots, N_{obj}$$

where $N_{obj}$ is a number of the plurality of objective function values. For each $f=f(h)$, $h \in P$, $f_{min} \leq f \leq f_{max}$, a scaling vector can be defined using $s=\max(1, f_{max}-f_{min})$, and a set can be defined using $S=\text{diag}(s)$. Using the first configuration list, a set of weight vectors may be stored in a matrix $\hat{W} \in \mathbb{R}^{n_p \times n_c}$ within a unit hypercube such that $W=S^{-1}\hat{W}=(S^{-1}\hat{w}_1, \ldots, S^{-1}\hat{w}_{n_c})$. For each $w_j \in W$, the desirability function is generated as $$d_j(x) = \sum_{i=1}^{n_p} w_{ij} f_i(h), j = 1, \ldots, n_c,$$

where a $j^{th}$ desirability function is assigned to a $j^{th}$ GSS instance.

In an operation 624, a unique column of a matrix $e \in [I, -I]$ is assigned to each GSS instance to indicate a current search direction e for the associated GSS instance, and an initial step size is assigned to each GSS instance using the initial step size value $\Delta$. Matrix e has dimension $N_v \times 2N_v$. For illustration, for $N_v=2$, there are $2*N_v=4$ desirability functions with one for each GSS instance. One of the four columns is assigned to each GSS instance to define the current search direction e for that GSS instance.

In an operation 626, initial Pareto fronts are determined from the first configuration list P of hyperparameter configurations and the objective function values $f_i(h)$ associated with each hyperparameter configuration h included in the first configuration list. A multi-objective optimization can be defined in terms of dominance and Pareto optimality. For an $N_{obj}$-objective minimizing optimization problem, a first hyperparameter configuration $h_1$ is dominated by a second hyperparameter configuration $h_2$, if $f_i(h_1) \geq f_i(h_2)$ for all $i=1, \ldots, N_{obj}$ and $f_j(h_1) > f_j(h_2)$ for some $j=1, \ldots, N_{obj}$. Referring again to FIG. 8, first front Pareto set of objective function values 800 may define the first Pareto front found based on the hyperparameter configurations shown by circles. Thus, the first Pareto front contains only nondominated solutions.

In the constrained case, first hyperparameter configuration $h_1$ is dominated by second hyperparameter configuration $h_2$ if $\text{viol}(h_1) > \epsilon$ and $\text{viol}(h_2) < \text{viol}(h_1)$, where $\text{viol}(h_1)$ denotes a maximum constraint violation at first hyperparameter configuration $h_1$, $\text{viol}(h_2)$ denotes a maximum constraint violation at second hyperparameter configuration $h_2$, and the feasibility tolerance is $\epsilon$. Feasibility has precedence over the objective function values for a hyperparameter configuration.

A crowding distance is defined as $\text{crowd}(h_1, h_2) = \max_i |f_i(h_1) - f_i(h_2)|$, $i=1, \ldots, N_{obj}$. Let $\text{crowd}(h_1, B)$ denote $$\min_{y \in A}$$

$\text{crowd}(h_1, h_2)$ the crowding distance of $h_1$ with respect to a set B, where B is an indicator of remaining hyperparameter configuration points other than $h_1$. A crowding distance is computed for each hyperparameter configuration h relative to the other hyperparameter configurations.

Figure 9:
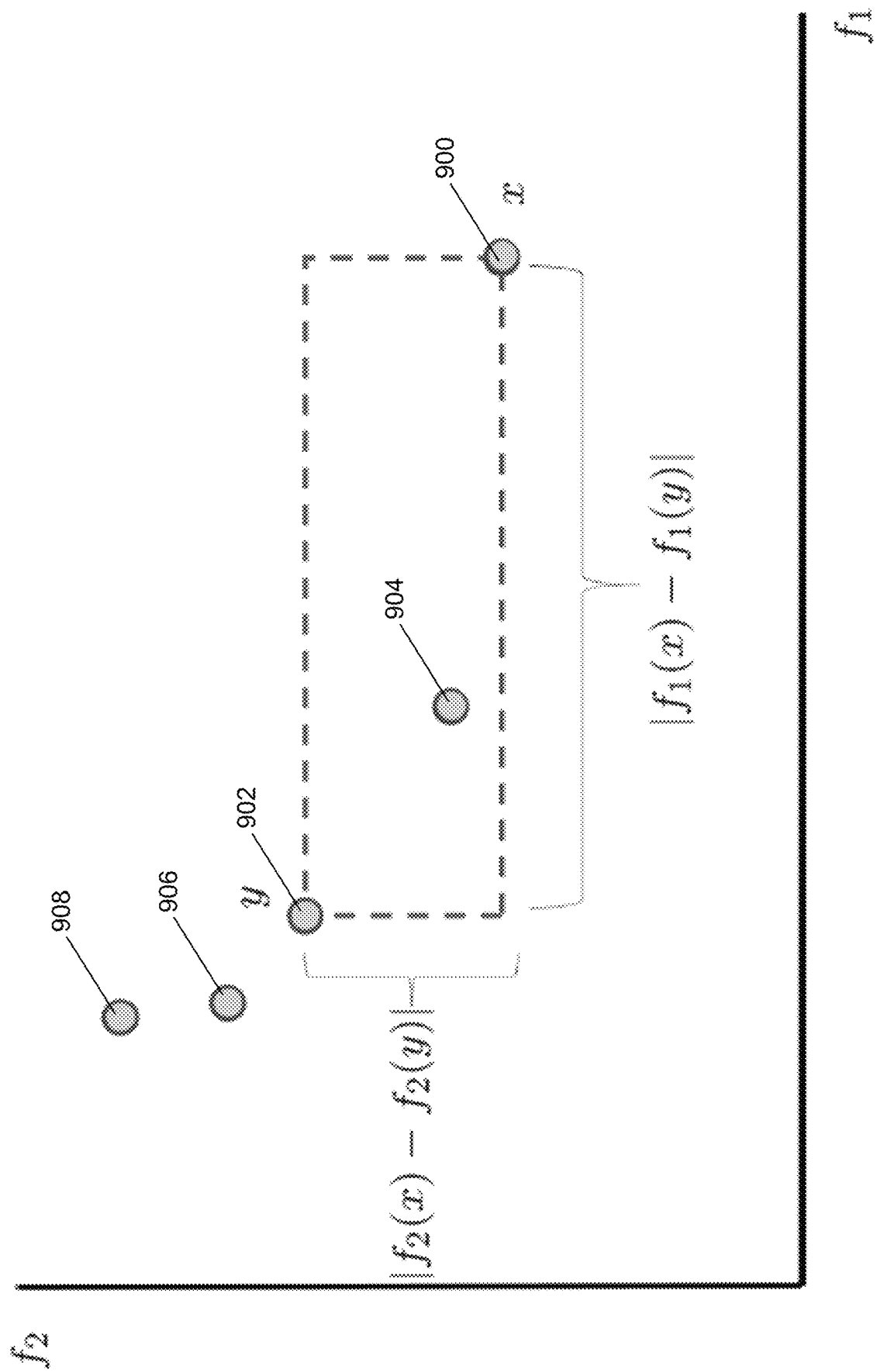
FIG. 9 illustrates a crowding distance computation in accordance with an illustrative embodiment.

Referring to FIG. 9, a crowding distance computation for two objective functions is illustrated between a first point (hyperparameter configuration) 900 and a second point 902, where first point 900 has a first objective function value $f_1(h_1)$ and a second objective function value $f_2(h)$, and second point 902 has a first objective function value $f_1(h_2)$ and a second objective function value $f_2(h_2)$. In the illustration, the first configuration list P of hyperparameter configurations included 5 points that each define a pair of objective function values. For example, the five points include first point 900, second point 902, a third point 904, a fourth point 906, and a fifth point 908. $h_1 \prec h_2$, where $\prec$ indicates $h_2$ dominates $h_1$, if $\text{viol}(h_2) > \epsilon$ and $\text{viol}(h_1) < \text{viol}(h_2)$ or if for $f(h) \leq f(h_2)$ there exists at least one index i, where $i=1, \ldots, N_{obj}$, such that $f_i(h_i) < f_i(h_2)$. Ties are decided by the point with the smallest tag number. For example, a tag number is assigned when a hyperparameter configuration is assigned for evaluation by a session. $C \prec h_2$ if there exists at least one point $h_1$ such that $h_1 \prec h_2$. $C \prec D$ if for each $h_2 \in D$, $C \prec h_2$. C is a Pareto front set if for each $h_1$ in C, $C-\{h_1\} \not\prec h_1$.

A semi-ordered set partition of the first configuration list P can be defined by the following recursive definition: $P_0=P$; $\mathcal{F}=\text{front}(P_i)$; and $P_{i+1}=P_i-\mathcal{F}_i$ to partition P into a set of ordered fronts $i=1, \ldots, \ell$, where $i=1$ defines the first ordered front that defines the Pareto front. $P_k = \cup_{i=1}^{\ell} \mathcal{F}_i$, where each $\mathcal{F}_k \prec \cup_{i=k+1}^{\ell} \mathcal{F}_i$. A complete ordering of P by incorporating the definition of crowding distance to distinguish point quality within a given front is defined. Thus, given two points $h_1$ and $h_2$ in P, $h_1 < h_2$, if $h_1 \in \mathcal{F}_j$ and $h_2 \in \mathcal{F}_k$ and $j<k$, and if $h_1, h_2 \in \mathcal{F}_j$ and $\text{crowd}(h_1, \mathcal{F}_j) > \text{crowd}(h_2, \mathcal{F}_j)$. In words, $\ell$ Pareto fronts are identified. A first Pareto front $\mathcal{F}_1$ is identified from the entire set of points and identified as $P_1$. With the $P_1$ points removed, a second Pareto front $\mathcal{F}_2$ is identified from the remaining set of points and identified as $P_2$, and so on until all of the points are placed into a Pareto front. Each hyperparameter configuration evaluated is included in a single Pareto front of a set of Pareto fronts. The hyperparameter configurations included in $P_1$ are included in the first Pareto front $\mathcal{F}_1$ and are a current "best" set of points. Optionally, when a size of $P_1$ is small, points from $P_2$ may be included as genetic material for creating a next population of points.

In summary, the first Pareto front is the nondominated points in the current population. Then, with the first Pareto front of points eliminated from consideration, the second Pareto front is created with the remaining points that are now nondominated by any other remaining points. The process continues until all of the points have been characterized into one of the fronts.

The first configuration list is divided into the successively nondominated Pareto front sets and Pareto points in a given front set can be ranked by crowding distance, where a hyperparameter configuration is associated with each Pareto point. Hyperparameter configurations with a higher crowding distance may be preferred. The crowding distance is a sum between nearest neighbors for each objective function value and is computed for each hyperparameter configuration in a Pareto front to quantify how close a given point is to its neighbors on the same Pareto front. "Nearest neighbors" refers to the two points on either side of a given point on the same Pareto front. If a point has a high crowding distance value, its neighbors are spread out and far away from each other. In this case, it is desirable to fill in these gaps on the Pareto front. As a result, points with a higher crowding distance are favored when determining which points to keep for further refinement in future iterations of the optimization process.

Figure 10:
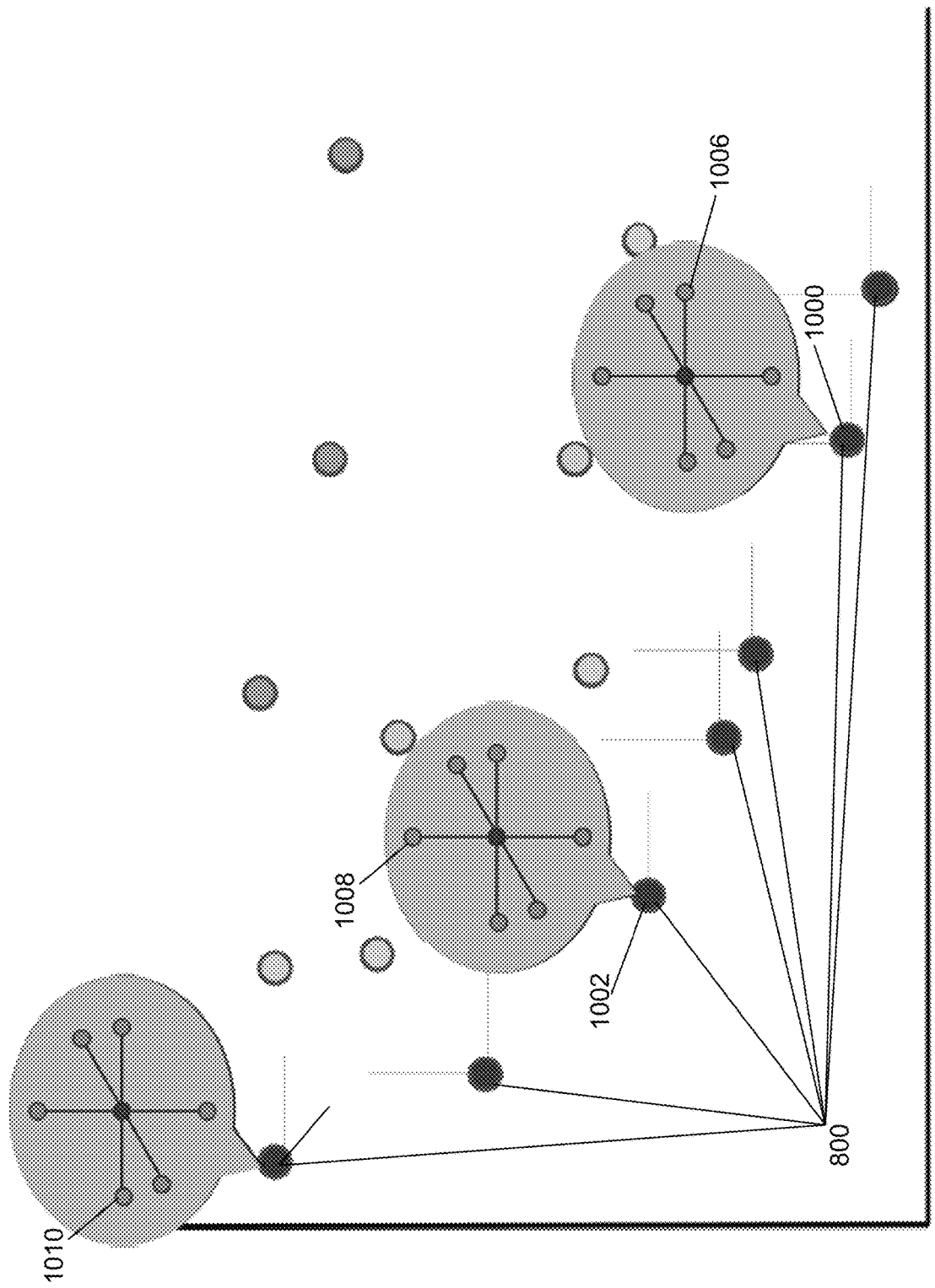
FIG. 10 illustrates a generating set search point determination in accordance with an illustrative embodiment.

Referring to FIG. 10, a current GA population is shown with a first GSS instance searching about a first Pareto point 1000, a second GSS instance searching about a second Pareto point 1002, and a third GSS instance searching about a third Pareto point 1004, where first Pareto point 1000, second Pareto point 1002, and third Pareto point 1004 are members of the first Pareto front. Each GSS instance is coupled with a separate desirability function to encourage each to seek out different Pareto front points. Because of the nature of desirability functions, each GSS instance centers on a point in the first Pareto front set of objective function values 800. A first direction point 1006 indicates a current active search direction e for the first GSS instance, a second direction point 1008 indicates a current active search direction e for the second GSS instance, a third direction point 1010 indicates a current active search direction e for the third GSS instance. First direction point 1006, second direction point 1008, and third direction point 1010 are orthogonal to each other. As each GSS instance cycles through its set of search directions by updating the assigned column in the matrix, the search directions remain orthogonal to each other. Thus, though the GSS instances are only loosely coupled, they are working together as a team by iterating through the different search directions.

The first configuration list generated using LHS is used as the starting point for the GA search instance to search the solution space for promising configurations, which enables directly attacking the multi-objective problem to evolve a set of Pareto-optimal solutions in one run of the optimization process instead of solving multiple separate problems. Local searches are supported using the GSS search instance neighborhoods around hyperparameter configurations included in the first Pareto front to improve objective function values and reduce crowding distance.

Figure 6A:
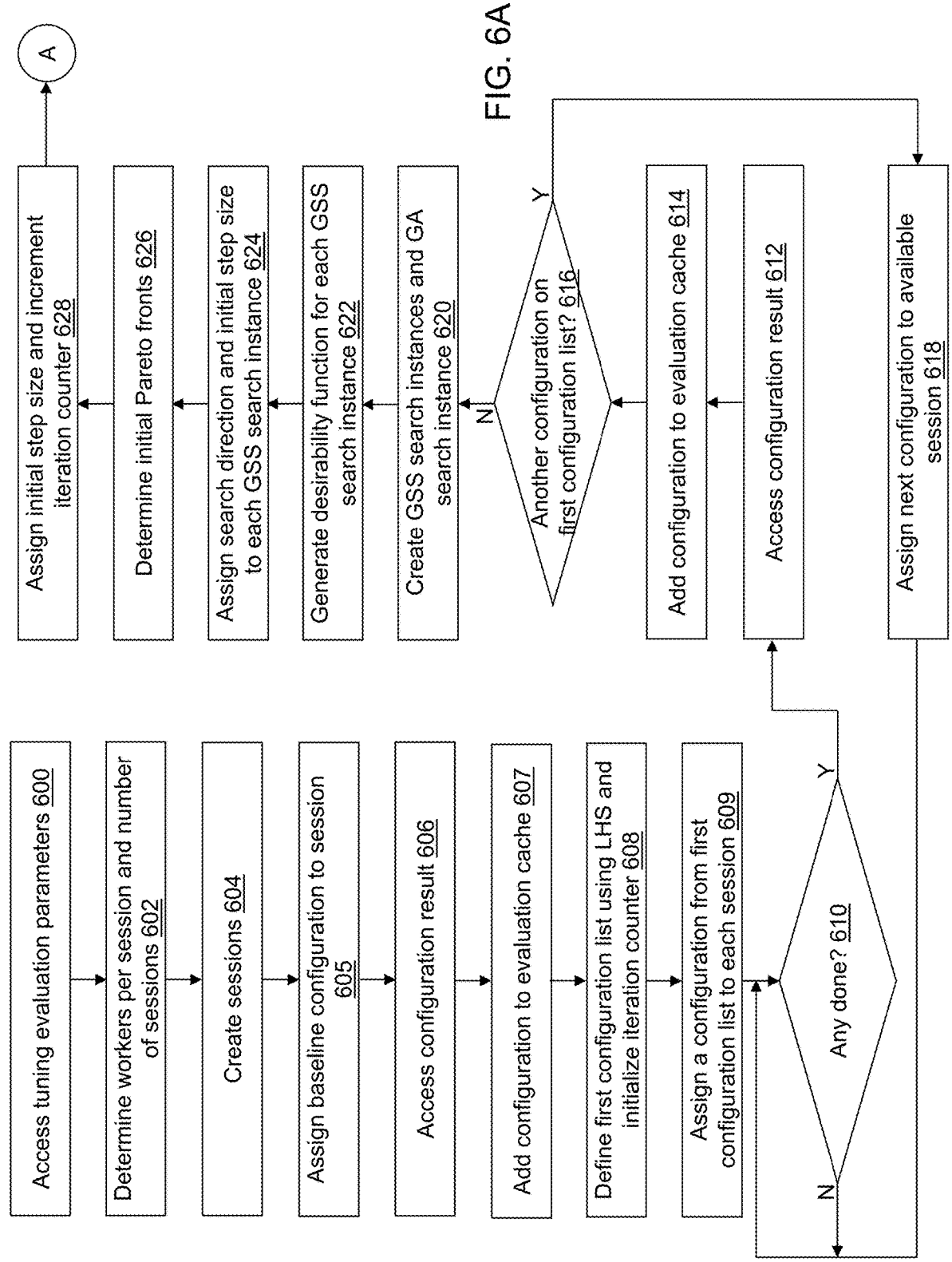
FIGS. 6A to 6D depict a flow diagram illustrating examples of operations performed by the selection manager device of FIG. 3 in accordance with an illustrative embodiment.
Figure 6B:
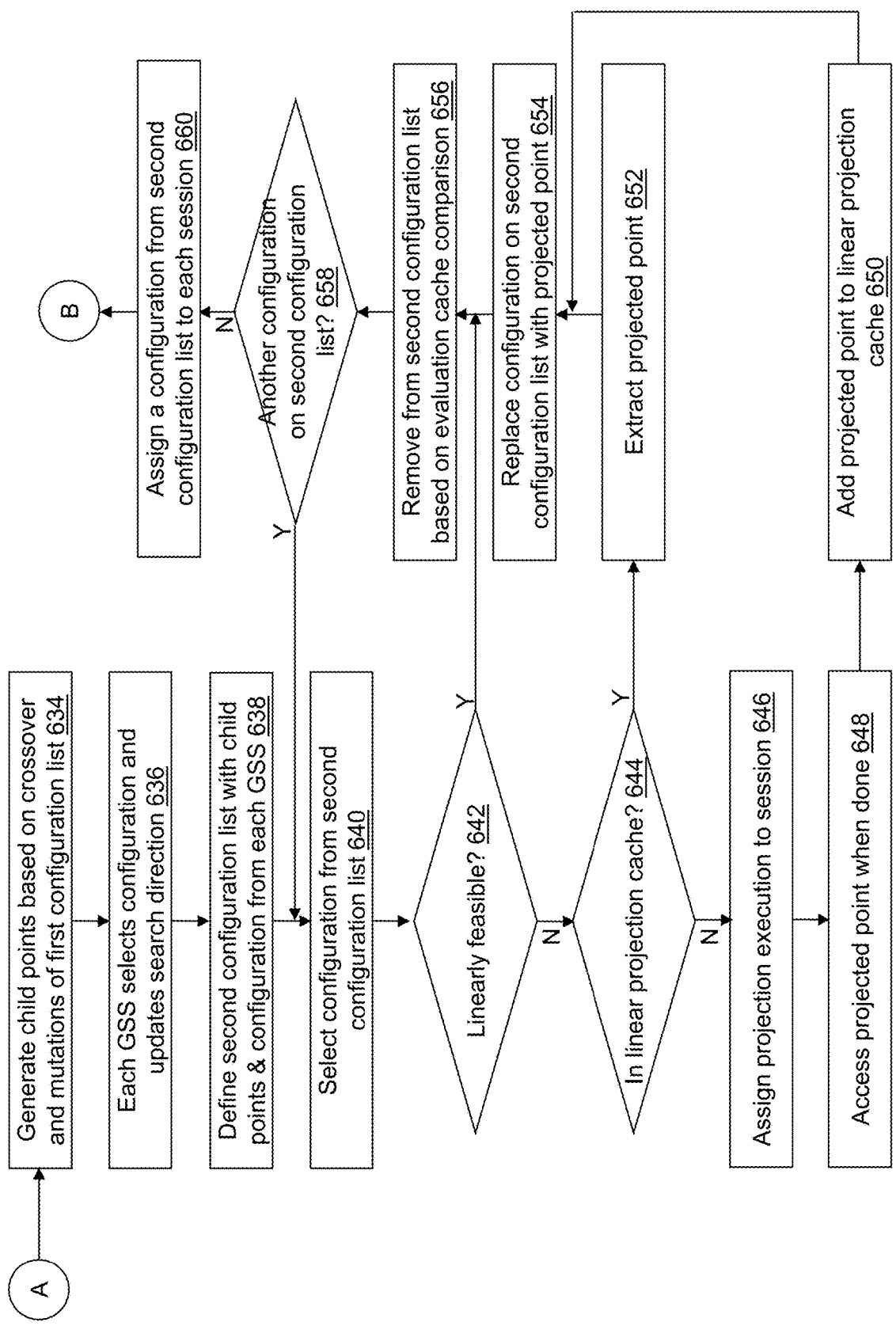
Figure 6C:
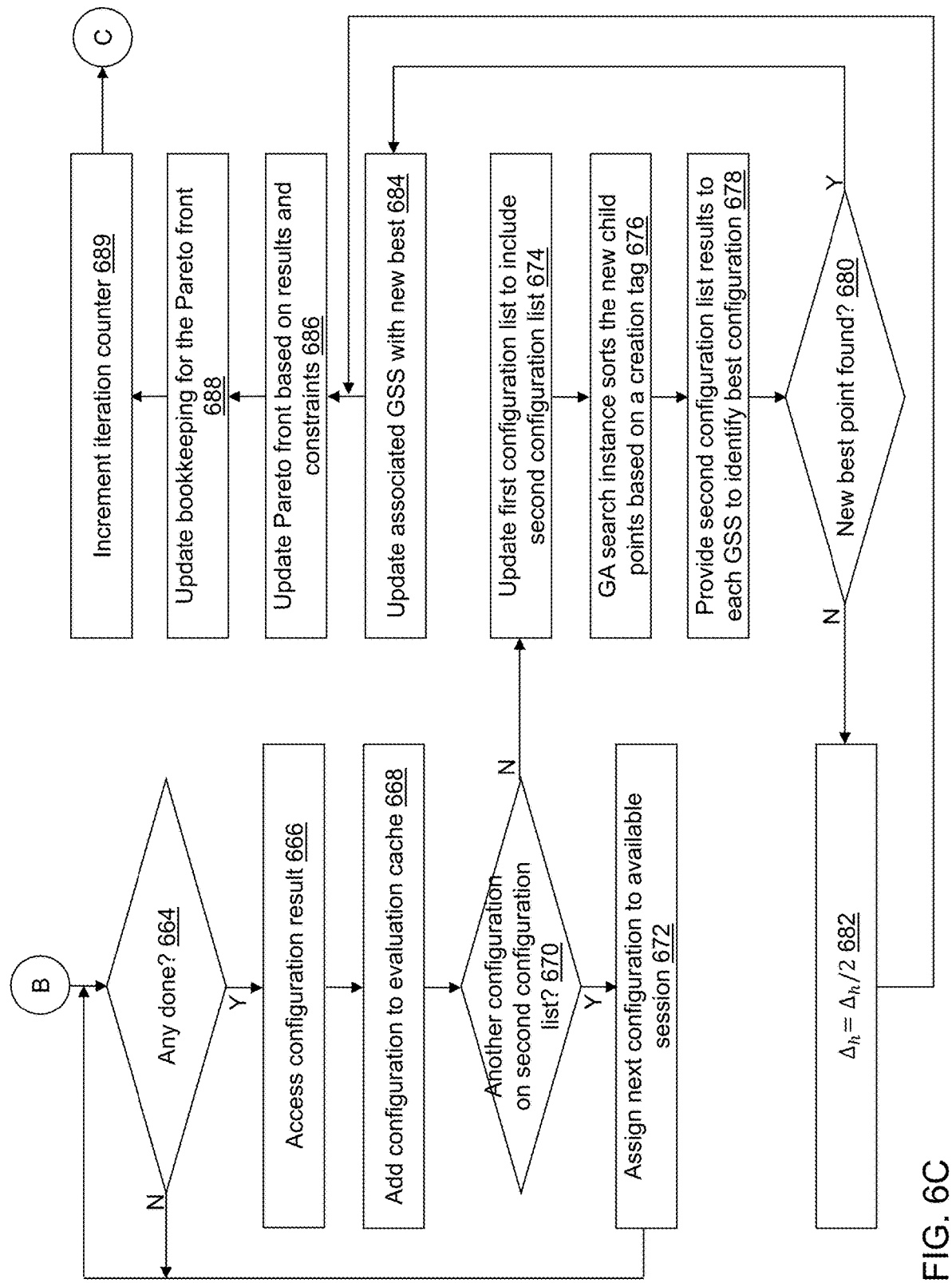

Referring again to FIG. 6A, in an operation 628, a step size is assigned to each configuration included in the first configuration list using the initial step size value Δ, the iteration counter is incremented, for example, using $N_k=N_k+1$, and processing continues in an operation 634 shown referring to FIG. 6B.

In operation 634, child points are generated based on crossover and mutations of the configurations on the first configuration list using the GA search method and its associated parameters and the objective function values computed from prior hyperparameter configuration executions. For example, a paper by Koch et al., *Autotune: A Derivative-available Optimization Framework for Hyperparameter Tuning* KDD 2018 (Aug. 2, 2018) describes a process for generating child points. Each child point is a new configuration of hyperparameter values that includes a value for each hyperparameter to evaluate.

In an operation 636, each GSS instance selects a hyperparameter configuration from the first Pareto front set such that each hyperparameter configuration includes a value for each hyperparameter to evaluate based on $h'_{p,i}=h_{p,i}+\Delta_{h_p,i}e_i$, $i=1, \ldots, n_c$, where $h_p$ is the hyperparameter configuration selected from the Pareto front, $\Delta_{h_p}$ is the step size of $h_p$, and e is the current search direction of the associated GSS instance. Each GSS instance increments its internal pointer to point to a next column of the matrix I so that on a next iteration e is updated to point in a next search direction.

For nonlinear constraints, a penalty function is added to an internal objective function, for example as described in J. D. Griffin and T. G. Kolda, *Nonlinearly constrained optimization using heuristic penalty methods and asynchronous parallel generating set search*, Applied Mathematics Research Express, vol. 2010, pp. 36-62 (2010). For simplicity, the problem can be written $$\minimize_{h \in \mathbb{R}^{N_V}} f(h)$$

$$\text{subject to } c(h) \geq 0$$

The GA instance and each GSS instance focuses on minimizing a merit function M(h) defined based on $$P(h) = \sum_{i=1}^{N_{nonlinear}} \max(0, -c_i(h))^2$$

$$M(h) = f(h) + \rho P(h)$$

where $N_{nonlinear}$ is a number of the nonlinear constraint functions, and ρ denotes a penalty parameter internally defined by the GA instance or the GSS instance. Thus, nonlinear constraints are handled by using smooth merit functions penalized with an L2-norm penalty term that is added to the objective function value ƒ(h) for the hyperparameter configuration h. In an illustrative embodiment, ρ=10,000. ƒ(h) and c(h) are stored in evaluation cache 314 to provide a fast look-up mechanism, for example, using splay trees and lexicographical ordering. Each GSS instance makes a decision using M(h) instead of ƒ(h), which is used in the unconstrained case. Due to this, each GSS instance is unaware that there are nonlinear constraints because it assumes that M(h) is the objective in place of ƒ(h).

At initialization, each GSS instance is assigned a function pointer/wrapper that may be referred to as a "combiner" that may be unique for each instance. The combiner builds M(h) from inputs ƒ(h) and c(h) for each respective GSS instance meaning that each GSS only needs to know about the pair (h, M(h)) to make decisions and does not use the actual values of ƒ(h) and c(h) outside of the definition of M(h).

In an operation 638, a second configuration list $P_2$ is defined that includes the configurations defined by the child points and the $h'_{p,i}$ defined by each GSS instance.

In an operation 640, a hyperparameter configuration $h_1$ is selected from the second configuration list $P_2$.

In an operation 642, a determination is made concerning whether the selected hyperparameter configuration $h_1$ is linearly feasible by applying the value of each hyperparameter assigned to the selected hyperparameter configuration $h_1$ to each linear constraint. Some hyperparameter values may not be used in any linear constraint. When the selected hyperparameter configuration $h_1$ is linearly feasible, processing continues in an operation 656. When the selected hyperparameter configuration $h_1$ is not linearly feasible, processing continues in an operation 644.

In operation 644, a determination is made concerning whether the selected hyperparameter configuration $h_1$ is included in linear projection cache 316. When the selected hyperparameter configuration $h_1$ is included in linear projection cache 316, processing continues in an operation 652. When the selected hyperparameter configuration $h_1$ is not included in linear projection cache 316, processing continues in an operation 646.

In operation 646, an available session is assigned a projection computation for the linearly infeasible selected hyperparameter configuration $h_l$.

In an operation 648, a projected hyperparameter configuration $\hat{h}_1 = \Theta(h_1)$ that has been projected to the linearly feasible region is accessed from the assigned session.

In an operation 650, the pair $(h_1, \Theta(h_1))$ is added to linear projection cache 316, and processing continues in operation 654.

In operation 652, the pair $(h_1, \Theta(h_1))$ is extracted from linear projection cache 316.

In operation 654, the projected point $\hat{h}_1 = \Theta(h_1)$ from operation 648 or from operation 652 replaces the selected hyperparameter configuration $h_1$ on the second configuration list such that $h_1 = \hat{h}_1$ resulting in the infeasible $h_1$ being overwritten with its linearly feasible counterpart $\hat{h}_1$. The original $h_1$ may be stored in a backup location if needed. Thus, $f(h)$ and $c(h)$ are always evaluated using linearly feasible points.

In operation 656, the second configuration list is updated based on a comparison of $h_1$ with each hyperparameter configuration included in evaluation cache 314. For example, $h_1$ is compared to previously evaluated hyperparameter configurations to determine if $h_1$ is "close enough" to hyperparameter configuration values that have already been evaluated, where "close enough" is evaluated based on the cache tolerance value associated with each hyperparameter. If so, the hyperparameter configuration $h_1$ is removed from the second configuration list to avoid expending computing resources reevaluating a "too similar" hyperparameter configuration. The objective function value of the "close" point in evaluation cache 314 may be defined as the objective function value of $h_1$ that is removed from the second configuration list.

In an operation 658, a determination is made concerning whether the second configuration list includes another hyperparameter configuration to evaluate. When the second configuration list includes another hyperparameter configuration, processing continues in operation 640. When the second configuration list does not include another hyperparameter configuration, processing continues in an operation 660.

In operation 660, a single hyperparameter configuration is selected from the second configuration list and assigned to each created session by loading the values in the data structure associated with the selected session and requesting execution by the selected session. The handle to the session process stored in the data structure associated with the selected session may be used to make this request or call. Processing continues in an operation 664 shown referring to FIG. 6C.

In operation 664, a determination is made concerning whether any execution is done. If no execution is done, processing continues in operation 664 until indication that a session is done is received. If any execution is done, processing continues in an operation 666.

In operation 666, results from the configuration execution are accessed in association with the hyperparameter configuration values defined for the configuration assigned to the session that has completed its computations. For example, an objective function value for each objective function of the plurality of objective functions indicated in operation 524 may be accessed using the data structure.

In an operation 668, the results including the objective function values $f(h_a)$ computed from execution of the assigned hyperparameter configuration values are stored in evaluation cache 314 and in model data 318 in association with $h_a$. A successive configuration execution number and the iteration counter $N_k$ may further be stored in model data 318 in association with the objective function values $f(h_a)$.

In an operation 670, a determination is made concerning whether the second configuration list includes another hyperparameter configuration to evaluate that has not been assigned to a session. When the second configuration list includes another hyperparameter configuration to evaluate, processing continues in operation 672. When the second configuration list does not include another hyperparameter configuration to evaluate, processing continues in an operation 674.

In operation 672, a next hyperparameter configuration is selected from the second configuration list and assigned to the now available session, the data structure associated with the now available session is updated to include the next assigned hyperparameter configuration. A request is sent to session manager device 400 associated with the now available session to execute model manager application 412 with the hyperparameter configuration included in the data structure, and processing continues in operation 664 to continue to monitor for sessions that have completed their assigned hyperparameter configuration evaluation.

In operation 674, the first configuration list P is updated to include the hyperparameter configurations associated with the hyperparameter configurations on the second configuration list with their associated step size.

In an operation 676, the GA search instance sorts the processed child points using a unique point creation tag that is not time-based to ensure that the current population is returned in the same order to each GSS instance despite leveraging the advantage of asynchronous evaluations. Ties are decided by the point with the smallest tag number. Providing the processed child points in the same order they were created ensures deterministic behavior on successive executions.

In an operation 678, the first configuration list P and the second configuration list results are provided to each GSS instance so that each can identify a best hyperparameter configuration. A hyperparameter configuration's status as best is determined based on which Pareto front it falls on, whether or not the point is feasible with respect to the linear constraints, and the objective function value computed for the hyperparameter configuration. The status values may be equal meaning that in a comparison between two hyperparameter configurations both configurations fall on the same Pareto front, both are linearly feasible, and both have identical objective function values. When the status values are equal between two hyperparameter configurations, the tie is broken by comparing the unique tag value. The hyperparameter configuration with a lower tag value is selected as the best hyperparameter configuration.

In an operation 680, each GSS instance determines whether the best hyperparameter configuration is a new hyperparameter configuration relative to the previously processed hyperparameter configuration. When a new best point is found, processing continues in an operation 684. When a new best point is not found, processing continues in an operation 682.

In operation 682, the pattern search was unsuccessful, so the step size is adjusted to $\Delta_h = \Delta_h / 2$ such that the step size for the current best hyperparameter configuration is reduced by half for the associated GSS instance, and processing continues in operation 686.

In operation 684, the pattern search was successful such that a current best hyperparameter configuration is replaced with the new best hyperparameter configuration identified by the associated GSS instance.

In an operation 686, the first Pareto front is updated based on the second configuration list results by comparing points in the second configuration list to the current first Pareto front.

In an operation 688, bookkeeping for the first Pareto front is updated. Results for each hyperparameter configuration of the second configuration list can be divided into nondominated Pareto front sets and Pareto points in a given front set can be ranked by crowding distance. Hyperparameter configurations with a higher crowding distance may be favored when determining which points to keep for further refinement in future iterations of the optimization process by either a GA or a GSS instance.

Maintaining and monitoring progress of a large front can grow in computational complexity. As a result, a fast progress metric provides first front monitoring. When computing progress from a current first Pareto front $\mathcal{F}_{N_k}$ to a next first Pareto front $\mathcal{F}_{n_k+1}$ (selected from the hyperparameter configurations included in the second configuration list), shared points S, dropped points D, and new points added N are maintained. When computing distance between sets, the delta changes D and N are defined as follows:

$$S = \mathcal{F}_{N_k} \cap \mathcal{F}_{N_k+1}$$

$$D = \mathcal{F}_{N_k} \setminus \mathcal{F}_{N_k+1}$$

$$N = \mathcal{F}_{N_k+1} \setminus \mathcal{F}_{N_k}$$

$$\mathcal{F}_{N_k} = S \cup D$$

$$\mathcal{F}_{N_k+1} = S \cup N$$

$$d(h_1, h_2) = |\Theta(h_1) - \Theta(h_2)| + \sum_{i=1}^{N_{obj}} |f_i(h_1) - f_i(h_2)|$$

$$d(p, F) = \min_{h_2 \in F}(p, h_2)$$

$$d(\mathcal{F}_{N_k}, \mathcal{F}_{N_k+1}) = \sum_{p \in F_{N_k}} d(p, \mathcal{F}_{N_k+1}) = \sum_{p \in D} d(p, \mathcal{F}_{N_k+1})$$

$$d(\mathcal{F}_{N_k+1}, \mathcal{F}\mathcal{F}_{N_k}) = \sum_{p \in F_{N_k+1}} d(p, \mathcal{F}_{N_k}) = \sum_{p \in N} d(p, \mathcal{F}_{N_k})$$

$$P(\mathcal{F}_{N_k}, \mathcal{F}_{N_k+1}) = \frac{d(\mathcal{F}_{N_k}, \mathcal{F}_{N_k+1}) + d(\mathcal{F}_{N_k+1}, \mathcal{F}_{N_k})}{\text{num points in } \mathcal{F}_{k+1}}$$

Without this change, computing $d(\mathcal{F}_{N_k}, \mathcal{F}_{N_k+1})$ has similar complexity in computation to distance matrix creation which grows quickly with front size. The fronts $\mathcal{F}_{N_k}$ are formed by the best results in evaluation cache 314.

Figure 6D:
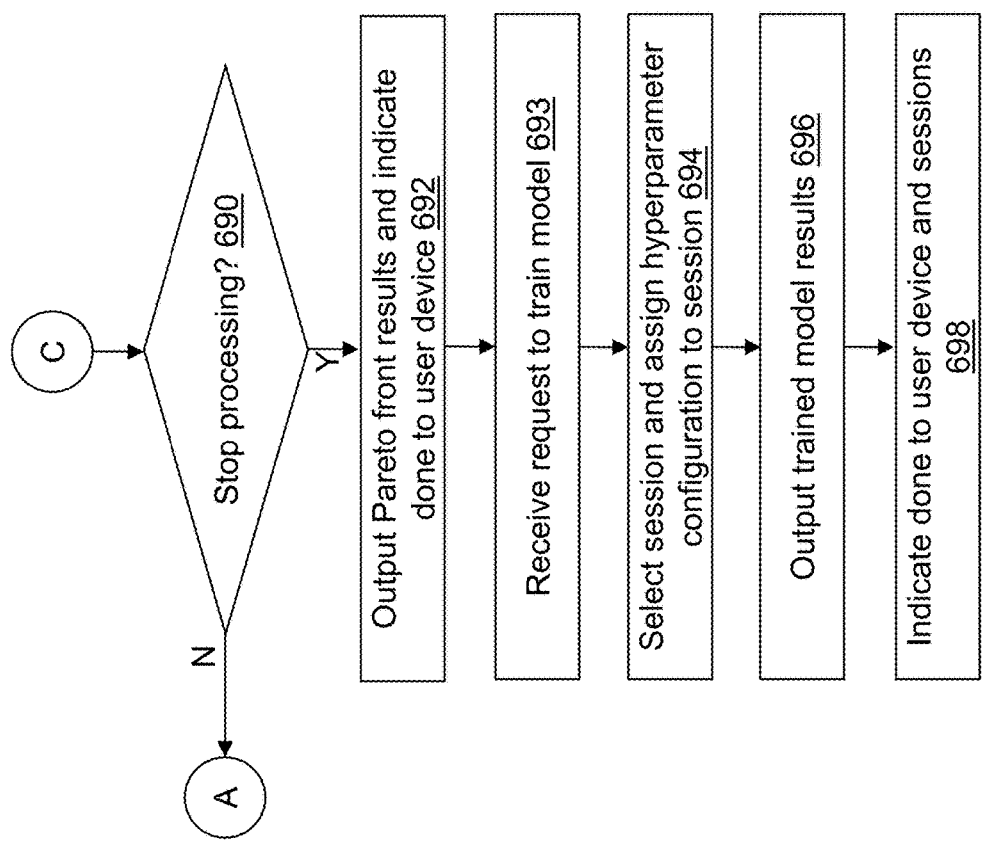

In an operation 689, the iteration counter is incremented, for example, using $N_k=N_k+1$, and processing continue in operation 690 shown referring to FIG. 6D.

In operation 690, a determination is made concerning whether processing is stopped. When processing is not stopped, processing continues in operation 634 to process additional hyperparameter configurations in a next iteration. When processing is stopped, processing continues in an operation 692. For example, processing is terminated when a maximum number of iterations have been performed, when a maximum number of hyperparameter configuration evaluations have been performed, when a maximum time (computing time or wall clock time) has been exceeded, when the results have converged, etc. Convergence can be based, for example, on a variation of an averaged Hausdorff distance extended for general constraints as described in O. Schutze et al., *Using the averaged hausdorff distance as a performance measure in evolutionary multiobjective optimization*, IEEE Transactions on Evolutionary Computation, vol. 16, pp. 504-522 (2012). As another option, processing is terminated if the current tuning search method(s) have each completed based on the parameters defined for each search method in operation 522. For example, a maximum number of iterations may have been exceeded by each of the current tuning search method(s).

The best model hyperparameter configurations from the previous iteration are used to generate the next population of hyperparameter configurations to evaluate with the selected model type. The results from all of the hyperparameter configurations as part of the current iteration are used to determine the next population irrespective of whether or not that search method requested evaluation of a specific hyperparameter configuration. In this manner, a search method gains information based on one or more hyperparameter configurations generated by another search method.

In operation 692, the updated Pareto front results are output, and an indicator that Pareto front processing is complete may be returned to user device 200. For example, the Pareto front results may be provided in a known storage location or otherwise provided to user device 200. Of all the configuration evaluations, the least infeasible Pareto front is output if no feasible trial points were identified, or the first Pareto front set with the best objective function values is output.

In an operation 693, a request to train the selected model type is received from user device 200 that includes a hyperparameter configuration selected from the updated first Pareto front results.

In an operation 694, a session is selected, the data structure associated with the selected session is updated with the received hyperparameter configuration, and the selected session is requested to execute the hyperparameter configuration based on the hyperparameter values in the data structure.

In an operation 696, characteristics that define the trained model using the selected hyperparameter configuration may be stored in selected model data 320. For example, the ASTORE procedure may be used to store the trained model for use in predicting a target value for a new observation vector included in new data such as input dataset 1524.

In an operation 698, an indicator that processing is complete may be returned to user device 200 and sent to each session.

Referring to FIG. 7, example operations associated with model manager application 412 and/or model worker application 432 in executing a hyperparameter configuration to compute the objective function values are described. Additional, fewer, or different operations may be performed depending on the embodiment. The order of presentation of the operations of FIG. 7 is not intended to be limiting.

Referring to FIG. 7, in an operation 700, an indicator of worker devices in the session to which session manager device 400 is assigned is received from selection manager device 104.

In an operation 702, the training data is loaded and distributed across the computing devices of the session such that each computing device is loaded with a portion of the training data.

In an operation 704, the portion of the training data distributed to each computing device of the session is distributed into training data subset 434 and validation data subset 436 at each session worker device 420 of the session and optionally into training data subset 414 and validation data subset 416 at session manager device 400. For example, session manager device 400 may request that each session worker device 420 create training data subset 434 and validation data subset 436 as a single-partition based on the fraction value indicated in operation 512. In this process, session manager device 400 may also partition its portion of the training data into training data subset 414 and validation data subset 416. For illustration, if fraction value is 0.3 or 30%, 30% of the observation vectors in the portion of the training data at each session worker device 420 of the session is extracted to create validation data subset 436 and the remaining 70% of the observation vectors in the portion of the training data at each session worker device 420 of the session forms training data subset 434. Similarly, if session manager device 400 also hosts a portion of the training data, 30% of the observation vectors in the portion of the training data at session manager device 400 is extracted to create validation data subset 416 and the remaining 70% of the observation vectors in the portion of the training data at session manager device 400 forms training data subset 414.

As another option, the portion of the training data distributed to each computing device of the session is distributed into a plurality of training data subsets 434 and validation data subset 436 at each session worker device 420 of the session and optionally into a plurality of training data subsets 414 and validation data subset 416 at session manager device 400. For example, session manager device 400 may request that each session worker device 420 create training data subsets 434 and validation data subset 436 from multiple partitions based on the number of folds F defined for cross-validation and indicated in operation 512. F−1 partitions form F−1 training dataset subsets 434 with the remaining partition forming validation data subset 436.

As discussed previously, using cross validation, each model evaluation requires F−1 training and scoring executions with different training data subsets. For example, if the number of folds value F=4, each session worker device 420 partitions its portion of the training data into four subsets A, B, C, D. For a first execution loop, a first partition (e.g., A) is selected to form a first training data subset 434 at each session worker device 420 with a fourth partition D selected to form validation data subset 436. For a second execution loop, a second partition (e.g., B) is selected to form a second training data subset 434 at each session worker device 420 with the fourth partition D again forming validation data subset 436. For a third execution loop, a third partition (e.g., C) is selected to form a third training data subset 434 at each session worker device 420 with the fourth partition D again forming validation data subset 436. Thus, the training and scoring process is repeated F−1 times with different training data subsets used to define the trained model and the same validation data used to determine scoring performance. The partitions may similarly be formed at session manager device 400 if a portion of the training data is stored to third computer-readable medium 408.

In an operation 706, a determination is made concerning whether a train/score request is received from selection manager device 104. If a train/score request is received, processing continues in an operation 708. If a train/score request is not received, processing continues in operation 720.

In operation 708, the data describing the train/score model process including the hyperparameter configuration is accessed. For example, data in the data structure associated with the thread is accessed.

In an operation 710, the model type is trained using the hyperparameter configuration accessed and training data subset 434 at each session worker device 420 and optionally training data subset 414 at session manager device 400.

In an operation 712, the model type is scored using the hyperparameter configuration accessed, the trained model defined in operation 710, and validation data subset 436 at each session worker device 420 and optionally validation data subset 416 at session manager device 400 to determine the plurality of objective function values based on the plurality of objective functions indicated in operation 524.

In an operation 714, a determination is made concerning whether the F−1 folds have been processed. F=1, when cross-validation is not performed. When there is another fold to process, processing continues in operation 710 to process the next partition of training data subset 434 and optionally training data subset 414. When there is not another fold to process, processing continues in operation 716.

In operation 716, the model configuration results are made available to selection manager device 104, for example, by including them in the data structure and/or updating a globally accessible table and/or storing them in model configuration data 418.

In an operation 718, the completion indicator of the data structure is set to notify selection manager device 104 that processing of the hyperparameter configuration is complete.

In operation 720, a determination is made concerning whether a projection request is received from selection manager device 104. If a projection request is received, processing continues in an operation 722. If a projection is not received, processing continues in operation 728.

In operation 722, the selected configuration is mapped to a corresponding projected point as summarized above and further described in J. D. Griffin, T. G. Kolda, and R. M. Lewis, *Asynchronous parallel generating set search for linearly constrained optimization*, SIAM Journal on Scientific Computing, vol. 30, pp. 1892-1924 (2008), where tangent directions to nearby constraints are constructed and used as search directions. Again, the constrained multi-objective optimization problem may have the form:

$$\underset{h \in \mathbb{R}^{N_v}}{\text{minimize}} f(h) = \left(f_1(h), \ldots, f_{N_{obj}}(h)\right)^T$$

$$\text{subject to } b_\ell \leq Ah \leq b_u$$

$$h_\ell \leq h \leq h_u$$

$$c_\ell \leq c(h) \leq c_u$$

where h is a vector of decision variables, $f(h)$ is a list of objective functions $f_1(h), \ldots, f_{N_{obj}}(h)$, $N_{obj} \geq 1$, T indicates a transpose, be is a vector of lower bounds defined for each linear constraint, A is a matrix in $\mathbb{R}^{N_v \times k}$ defining linear constraints, $N_v$ is a number of decision variables, k is the number of linear constraints, $b_u$ is a vector of upper bounds defined for each linear constraint, $h_l$ is a vector of lower bounds defined for each linear constraint assuming that A=I, I is an identity matrix, $h_u$ is a vector of upper bounds defined for each linear constraint assuming that A=I, $c_l$ is a vector of lower bounds defined for each nonlinear constraint, c(h) is a list of nonlinear constraint functions c: $\mathbb{R}^{N_v} \to \mathbb{R}^m$, m is the number of nonlinear constraints, and $c_u$ is a vector of upper bounds defined for each nonlinear constraint. $f(h)$ and c(h) can be treated as black-box nonlinear functions meaning no assumption is made concerning an internal structure though a mechanism is provided by the user to obtain $f(h_t)$ and $c(h_t)$ given a trial-point $h_t$ of decision variables.

Given a hyperparameter configuration h, a closest $\hat{h} \in \mathcal{F}$ where $\mathcal{F} = \{\hat{h}$ such that $b_l \leq A\hat{h} \leq b_u$ and $h_l \leq \hat{h} \leq h_u\}$ is found at which to sample $f(h)$. Closest depends on choice of norm. Using the one-norm, the non-smooth subproblem below results:

$$\underset{\hat{h} \in \mathbb{R}^{N_v}}{\text{minimize}} \|\hat{h} - h\|_1 = \sum_{i=1}^{N_v} |\hat{h}_i - h_i|$$

subject to $b_l \leq A\hat{h} \leq b_u$ $h_l \leq \hat{h} \leq h_u$

To use a linear programming solver for linear problems, transformation splitting variables can be applied by introducing two new variables r and s:

$\hat{h} - h = r - s$ $r, s \geq 0$ $r_i s_i = 0$, for $i = 1, \ldots, N_v$ $|\hat{h} - h| = r + s$ The equivalent smooth problem becomes $$\underset{\hat{h} \in \mathbb{R}^{N_v}, r \in \mathbb{R}^{N_v}, s \in \mathbb{R}^{N_v}}{\text{minimize}} = \sum_{i=1}^{N_v} (r_i + s_i)$$

subject to $\hat{h} - r + s = h$ $b_l \leq A\hat{h} \leq b_u$ $h_l \leq \hat{h} \leq h_u$ $r, s \geq 0$ where the optimality conditions imply that $r_i s_i = 0$. The linear problem can be written as:

$$\underset{v \in \mathbb{R}^{3N_v}}{\text{minimize}} v^T q \quad (1)$$

subject to $g_l \leq Hv \leq g_u$ $v_l \leq v \leq v_u$

The new objective is $q = \begin{pmatrix} 0 \\ e \\ e \end{pmatrix}$, where $g_l = \begin{pmatrix} b_l \\ h \end{pmatrix}, H = \begin{pmatrix} A & 0 & 0 \\ I & -I & I \end{pmatrix},$ $g_u = \begin{pmatrix} b_u \\ h \end{pmatrix},$ $v_l = \begin{pmatrix} h_l \\ 0 \\ 0 \end{pmatrix},$ $v = \begin{pmatrix} \hat{h} \\ r \\ s \end{pmatrix} \in \mathbb{R}^{3n},$ $v_u = \begin{pmatrix} h_u \\ \infty \\ \infty \end{pmatrix}$ where e is a vector of all ones, and I has dimension $N_v \times N_v$. The projection operator that takes h and maps it to its corresponding projection $\hat{h}$ by solving equation (1) is $\Theta(h) = \hat{h}$ and $$\underset{h \in \mathbb{R}^n}{\text{minimize}} f(\Theta(h)) = \left( f_1(\Theta(h)), \ldots, f_{N_{obj}}(\Theta(h)) \right)^T \quad (2)$$

subject to $c_l \leq c(\Theta(h)) c_u$ where the constraints are implicitly satisfied by the definition of $\Theta(x)$. Equation (2) implicitly satisfies the linear constraints. Computing the projected hyperparameter configuration involves solving equation (1), which allows application of each GA/GSS to solve equation (2) even though they may not support linear constraints directly. Each GA/GSS proposes new hyperparameter configurations that are themselves projected and the projected point evaluated by a selected session. The projected point is based on the linearly feasible evaluation. So equation (1) is solved many times in the process of attempting to solve equation (2). Equation (2) is identical to the original problem to solve except using projections in the definition to show the perspective of the problem from the GA/GSS's point of view. Since linear optimization problems are either always feasible or infeasible, if, on the first iteration, any of the projections returns an infeasible status, the optimization problem stops, and control is returned to the user with a status of infeasible.

In an operation 724, the projection result $\hat{h} = \Theta(h)$ is made available to selection manager device 104, for example, by including it in the data structure and/or updating a globally accessible table.

In an operation 726, the completion indicator of the data structure is set to notify selection manager device 104 that processing of the projection is complete.

In an operation 728, a determination is made concerning whether processing is stopped. For example, a done indicator may be received from selection manager device 104. When processing is stopped, processing continues in an operation 730. When processing is not stopped, processing continues in operation 706.

In operation 730, cleanup is performed.

Figure 11:
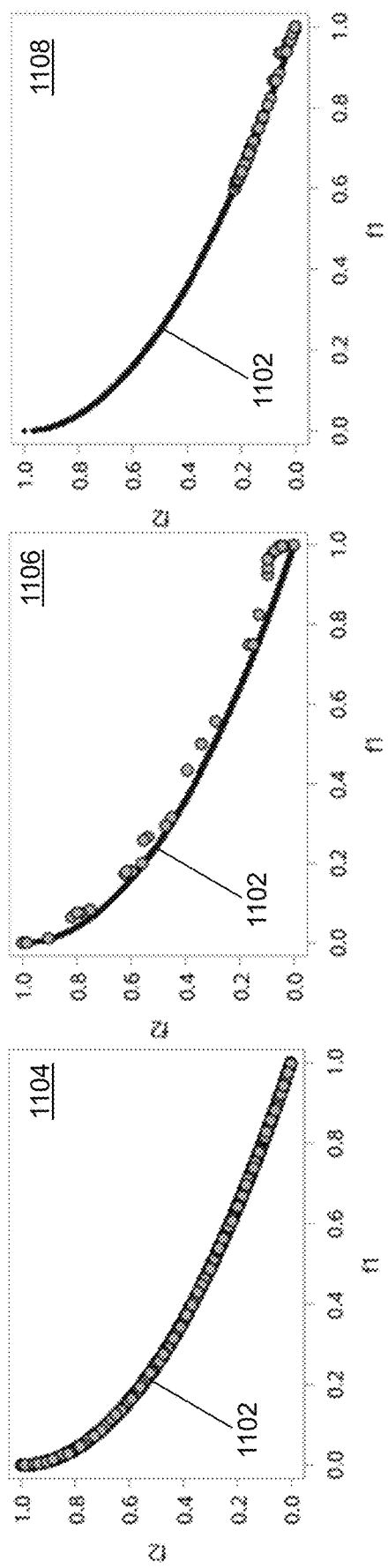
FIG. 11 provides a comparison between multi-objective results computed for a first optimization problem in accordance with an illustrative embodiment.

To evaluate the performance of model tuning application 222 and its effectiveness in solving multi-objective optimization problems, model tuning application 222 was applied to a set of common multi-objective optimization benchmark problems. Referring to FIG. 11, a comparison between multi-objective results computed for a first optimization problem is provided in accordance with an illustrative embodiment. The first optimization problem is referred to as ZDT1. The mathematical formulation for ZDT1 is shown in a first equation set 1100. The true Pareto front is known and shown in a first curve 1102 included in a first results graph 1104, a second results graph 1106, and a third results graph

1108. The circles in each of first results graph 1104, second results graph 1106, and third results graph 1108 show the Pareto front results computed using model tuning application 222.

ZDT1 is a multi-objective optimization problem with two objective functions ($f_1, f_2$) and 30 decision variables or hyperparameters. First results graph 1104 shows results using model tuning application 222 when run with a sufficiently large evaluation budget of 25,000 evaluations. Model tuning application 222 completely and accurately captured the true Pareto front.

Many times in real-world use cases, evaluation budgets are limited due to time and cost. Second results graph 1106 shows results using model tuning application 222 when run with a limited evaluation budget of 5000 evaluations. In this case, model tuning application 222 did not completely capture the Pareto front because there are significant gaps relative to first curve 1102.

Constraints can be added to the optimization to focus the search to a particular region of the solution space. To demonstrate the power of applying constraints, third results graph 1108 shows the result of using model tuning application 222 when run with a limited evaluation budget of 5000 evaluations while applying a constraint defined as $f_1 \geq 0.6$. Adding the constraint focused the optimization to the lower-right region of the solution space and allowed model tuning application 222 to capture an accurate representation of the true Pareto front in the region where $f_1 \geq 0.6$.

Figure 12:
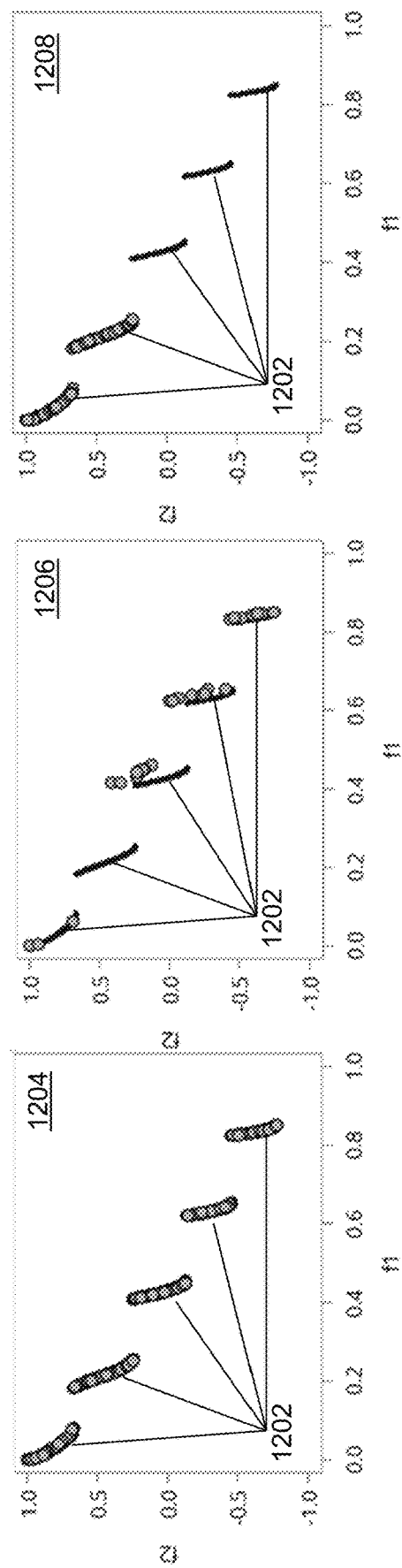
FIG. 12 provides a comparison between multi-objective results computed for a second optimization problem in accordance with an illustrative embodiment.

Referring to FIG. 12, a comparison between multi-objective results computed for a second optimization problem is provided in accordance with an illustrative embodiment. The second optimization problem is referred to as ZDT3. The mathematical formulation for ZDT3 is shown in a first equation set 1200. The true Pareto front is known and shown in a first set of curves 1202 included in a fourth results graph 1204, a fifth results graph 1206, and a sixth results graph 1208. The circles in each of fourth results graph 1204, fifth results graph 1206, and sixth results graph 1208 show the Pareto front results computed using model tuning application 222.

ZDT3 is a multi-objective optimization problem with two objective functions ($f_1, f_2$) and 30 decision variables. Fourth results graph 1204 shows results using model tuning application 222 when run with a sufficiently large evaluation budget of 25,000 evaluations. Model tuning application 222 completely and accurately captured the true Pareto front shown by first set of curves 1202.

Fifth results graph 1206 shows results using model tuning application 222 when run with a limited evaluation budget of 5000 evaluations. In this case, model tuning application 222 did not completely capture the Pareto front because there are significant gaps relative to first set of curves 1202.

Sixth results graph 1208 shows the result of using model tuning application 222 when run with a limited evaluation budget of 5000 evaluations while applying a constraint defined as $f_1 \leq 0.3$. Adding the constraint focused the optimization to the left region of the solution space and allowed model tuning application 222 to capture an accurate representation of the true Pareto front in the region where $f_1 \leq 0.3$.

The experimental results for ZDT1 and ZDT3 demonstrate that model tuning application 222 correctly captures the Pareto front of the benchmark problems when given adequate evaluation budgets. By using constraints, model tuning application 222 was able to significantly improve the search efficiency by focusing on the regions of the solution space of interest.

Model tuning application 222 was further executed using two different much larger real-world machine learning applications. A first dataset was defined from the Kaggle Donors Choose challenge. The second dataset was a sales leads data set. After a preliminary study of different model types, including logistic regression, decision trees, random forests, and gradient boosted trees, the gradient boosted tree model type was selected for both case studies as the other model types all significantly underperformed. Table I below presents the tuning hyperparameters of gradient boosted tree, their ranges, and default values.

TABLE 1

| Hyperparameter | Lower | Default | Upper |
| --- | --- | --- | --- |
| Num Trees | 100 | 100 | 500 |
| Num Vars to Try | 1 | all | all |
| Learning Rate | 0.01 | 0.1 | 1.0 |
| Sampling Rate | 0.1 | 0.5 | 1.0 |
| Lasso | 0.0 | 0.0 | 10.0 |
| Ridge | 0.0 | 0.0 | 10.0 |
| Num Bins | 20 | 20 | 50 |
| Maximum Levels | 2 | 6 | 7 |

For both studies, LHS was used to define the initial population with the GA and GSS algorithms used to refine the solution. The population size used was 50 and the maximum number of iterations was 20. The tuning process was executed on a compute cluster with 100 worker computing devices. Individual model training used multiple worker nodes, and multiple were are trained in parallel.

Figure 13:
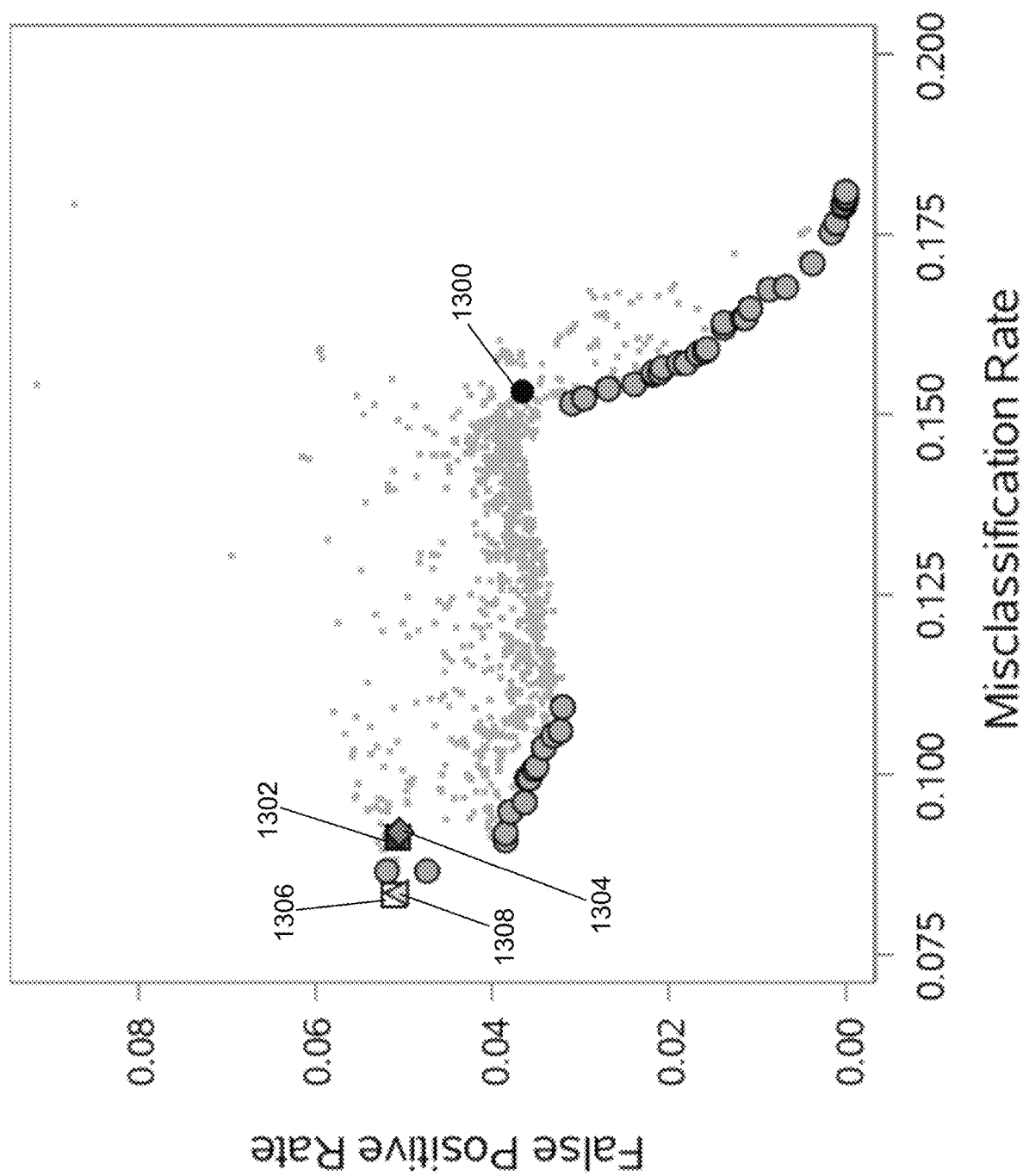
FIG. 13 provides multi-objective results computed for a gradient boosted tree model using a first dataset in accordance with an illustrative embodiment.
Figure 14:
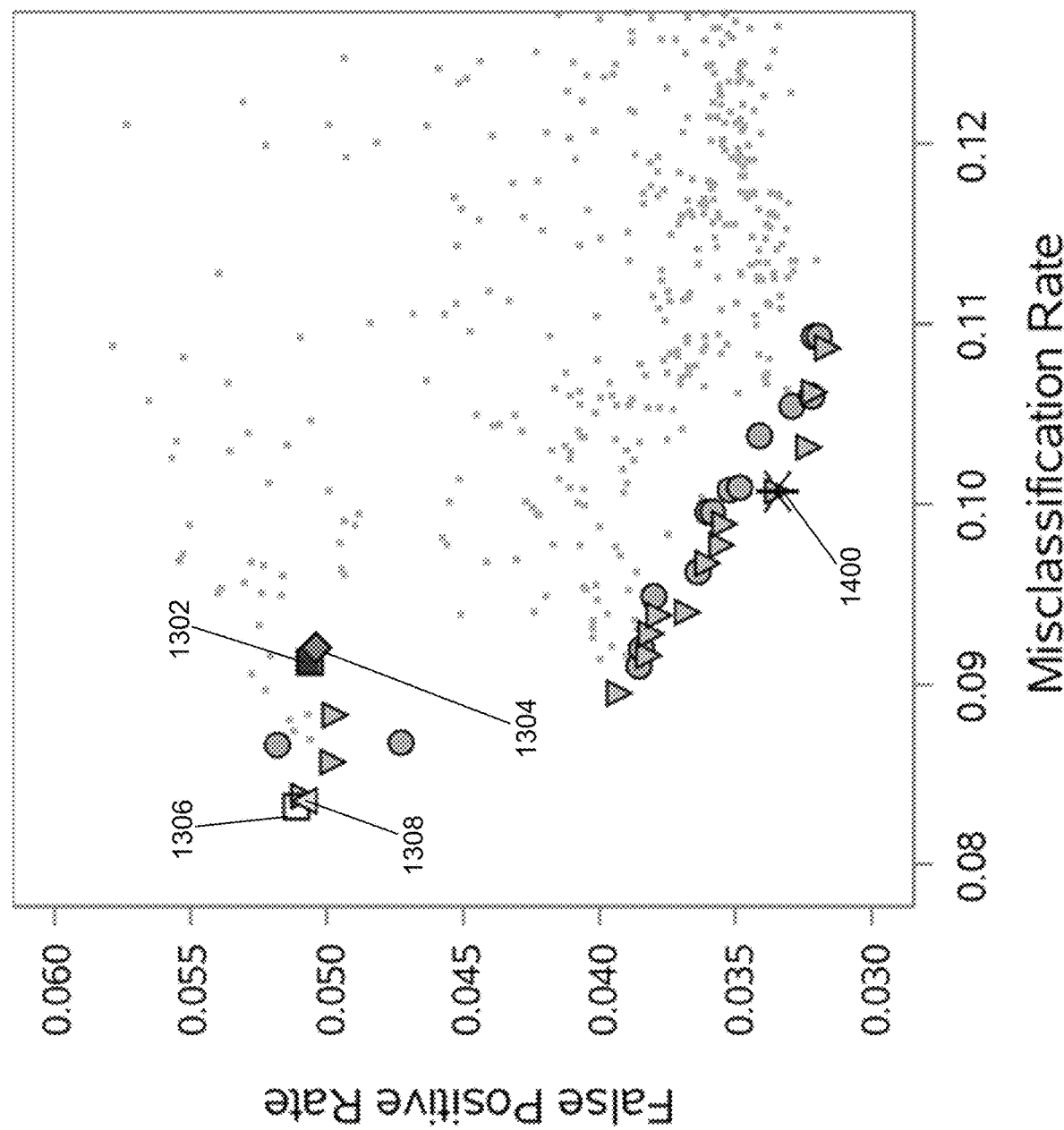
FIG. 14 provides further multi-objective results computed for a gradient boosted tree model using the first dataset in accordance with an illustrative embodiment.

Referring to FIGS. 13 and 14, multi-objective results computed for a gradient boosted tree model using the first dataset are provided in accordance with an illustrative embodiment. The first dataset used data from the website DonorsChoose.org, which is associated with a charitable organization that provides a platform for teachers to request materials for projects. The objective was to identify projects that are likely to attract donations based on the historical success of previous projects. Since DonorsChoose.org receives hundreds of thousands of proposals each year, automating the screening process and providing consistent vetting with a machine learning model allows volunteers to spend more time interacting with teachers to help develop successful projects. Properly classifying whether or not a project is exciting is a primary objective, but an important component of that is to minimize the number of projects improperly classified as exciting (false positives). This ensures that valuable human resources are not wasted vetting projects that are likely to be unsuccessful.

The first dataset included 24 variables describing the project, including: the type of school (metro, charter, magnet, year-round, NLNS), the school state/region, an average household income for the region, a grade level, subject, and focus area for the project, teacher information, and various aspects of project cost.

The first dataset included 620,672 proposal records, of which roughly 18% were ultimately considered worthy of a review by the volunteers. A binary variable labeling whether or not the project was ultimately considered exciting is used as the target for predictive modeling. The data set was partitioned into 70% for training (434,470) and 30% for validation (186,202) for tuning the gradient boosted tree predictive model. As mentioned in the study data set description, using misclassification rate as a single objective is insufficient, and a successful predictive model is expected to also minimize the false positive rate making the solution a multi-objective optimization with misclassification rate and false positive rate (FPR) as the two objective functions. The default gradient boosted tree model used the default hyperparameter configuration listed in Table 1. Its confusion matrix is shown in Table 2 below.

TABLE 2

| Target | Predicted False | Predicted True |
|---|---|---|
| False | 146,956 | 5,562 |
| True | 22,963 | 10,721 |

The default model predicted 5,562 false positives, a significant amount. The FPR on the validation data set was 3.6%. The overall misclassification rate on the validation set was high, around 15%, and needed to be improved, ideally while also improving FPR.

Referring to FIG. 13, the entire set of evaluated configurations is shown. The results using the default model are indicated by a default point 1300 and the generated Pareto front, trading off the minimization of misclassification on the x-axis and the minimization of the FPR on the y-axis is shown by the larger circles. The cloud of points is split into two distinct branches, one branch trending towards a near zero FPR value, and another branch trending towards lower misclassification values, resulting in a split set of Pareto points. The default configuration appears to be a near equal compromise of the two objectives. Several other tuning runs were executed with various traditional metrics (AUC, KS, MCE and F1) as a single objective. The best model configurations for each are shown as AUC point 1302, KS point 1304, MCE point 1306, and F1 point 1308. Nearly all of the single objective runs converged to similar values of misclassification and FPR. All of them sacrificed some FPR in the process, which is undesirable as defined by the conditions of the study.

While the near zero FPR values are appealing, the increase in the misclassification makes these configurations undesirable. It is more beneficial to look at models with both objectives reduced compared to the default model. Because of this, an additional tuning run was executed with an added constraint of misclassification <0.15. Referring to FIG. 14, the Pareto points for this tuning run are shown zoomed into the area of interest. The triangles indicate the constrained points. For illustration, a best configuration was selected and is indicated by best point 1400. The confusion matrix for this 'Best' model is shown in Table 3 below.

TABLE 3

| Target | Predicted False | Predicted True |
|---|---|---|
| False | 147,417 | 5,101 |
| True | 13,650 | 20,034 |

The number of false positives was reduced by 8% (461) compared to the default model but more importantly, the misclassification improved from 15% to 10%.

Figure 15:
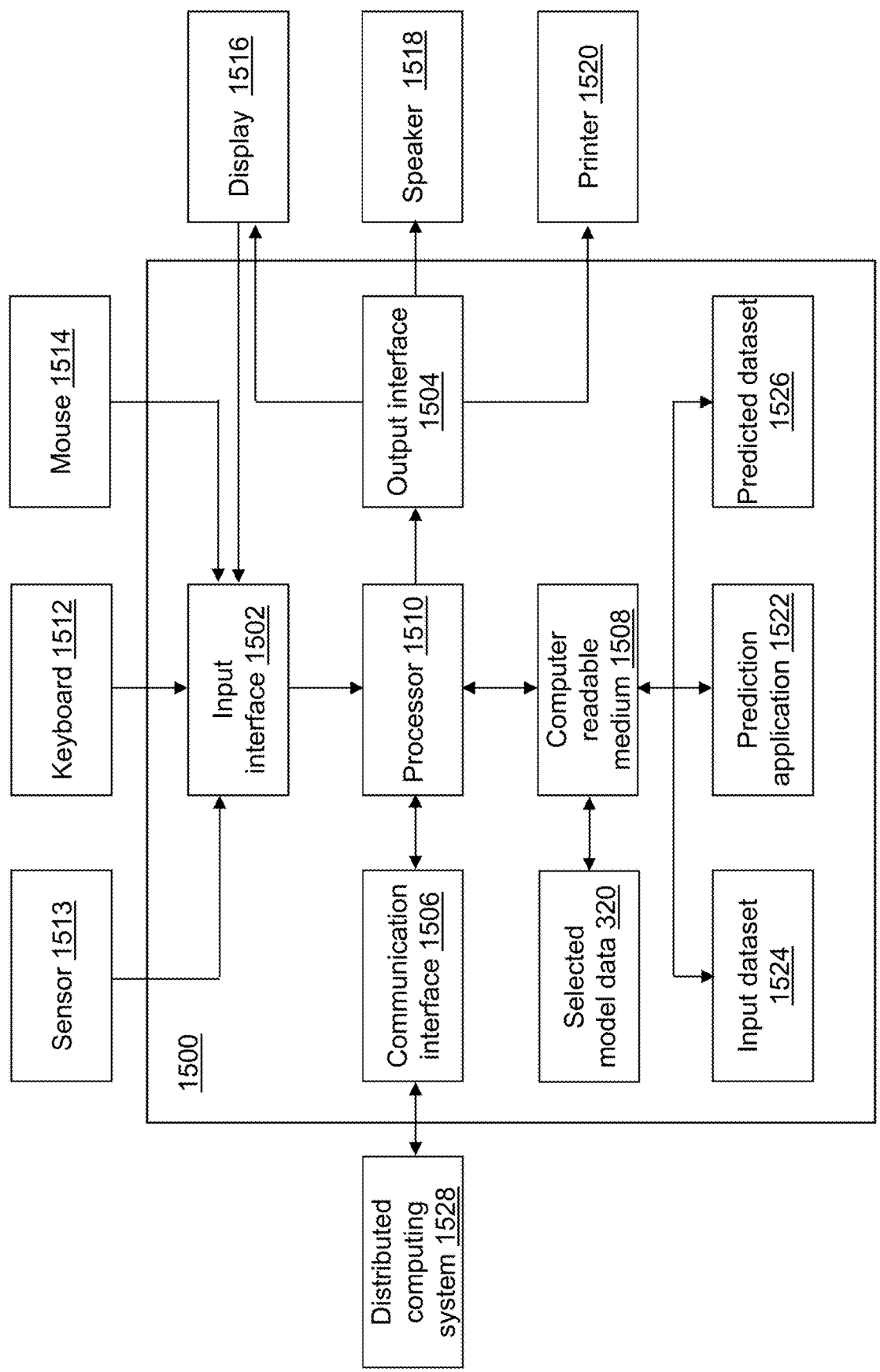
FIG. 15 depicts a block diagram of a prediction device in accordance with an illustrative embodiment.

Referring to FIG. 15, a block diagram of a prediction device 1500 is shown in accordance with an illustrative embodiment. Prediction device 1500 may include a fifth input interface 1502, a fifth output interface 1504, a fifth communication interface 1506, a fifth non-transitory computer-readable medium 1508, a fifth processor 1510, a prediction application 1522, selected model data 320, input dataset 1524, and predicted dataset 1526. Fewer, different, and/or additional components may be incorporated into prediction device 1500. Prediction device 1500 and user device 200 and/or selection manager device 104 may be the same or different devices.

Fifth input interface 1502 provides the same or similar functionality as that described with reference to input interface 202 of user device 200 though referring to prediction device 1500. Fifth output interface 1504 provides the same or similar functionality as that described with reference to output interface 204 of user device 200 though referring to prediction device 1500. Fifth communication interface 1506 provides the same or similar functionality as that described with reference to communication interface 206 of user device 200 though referring to prediction device 1500. Data and messages may be transferred between prediction device 1500 and a distributed computing system 1528 using fifth communication interface 1506. Fifth computer-readable medium 1508 provides the same or similar functionality as that described with reference to computer-readable medium 208 of user device 200 though referring to prediction device 1500. Fifth processor 1510 provides the same or similar functionality as that described with reference to processor 210 of user device 200 though referring to prediction device 1500.

Prediction application 1522 performs operations associated with classifying or predicting a characteristic of data stored in input dataset 1524 and/or identifying outliers in input dataset 1524 to support various data analysis functions as well as provide alert/messaging related to the classified data and/or identified outliers. Dependent on the type of data stored in the training data and input dataset 1524, prediction application 1522 may identify anomalies as part of process control, for example, of a manufacturing process, for machine condition monitoring, for example, an electrocardiogram device, for image classification, for intrusion detection, for fraud detection, etc. Some or all of the operations described herein may be embodied in prediction application 1522. The operations may be implemented using hardware, firmware, software, or any combination of these methods.

Referring to the example embodiment of FIG. 15, prediction application 1522 is implemented in software (comprised of computer-readable and/or computer-executable instructions) stored in fifth computer-readable medium 1508 and accessible by fifth processor 1510 for execution of the instructions that embody the operations of prediction application 1522. Prediction application 1522 may be written using one or more programming languages, assembly languages, scripting languages, etc. Prediction application 1522 may be integrated with other analytic tools. As an example, prediction application 1522 may be part of an integrated data analytics software application and/or software architecture such as that offered by SAS Institute Inc. of Cary, N.C., USA. For example, prediction application 1522 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 1522 may be implemented using or integrated with one or more SAS software tools such as Base SAS, SAS/STAT®, SAS® High Performance Analytics Server, SAS® LASR™ SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 1522 further may be performed by an ESPE. Prediction application 1522, model tuning application 222, selection manager application 312, model manager application 412, and model worker application 432 may be the same or different applications that are integrated in various manners to select hyperparameters for and execute a predictive model using the training data and/or input dataset 1524 in a single computing device or a plurality of distributed computing devices.

Prediction application 1522 may be implemented as a Web application. Prediction application 1522 may be integrated with other system processing tools to automatically process data generated as part of operation of an enterprise, to classify data in the processed data, to identify any outliers in the processed data, and/or to provide a warning or alert associated with the data classification and/or outlier identification using fifth input interface 1502, fifth output interface 1504, and/or fifth communication interface 1506 so that appropriate action can be initiated in response. For example, a warning or an alert may be presented using a second display 1516, a second speaker 1518, a second printer 1520, etc. or sent to one or more computer-readable media, display, speaker, printer, etc. of distributed computing system 1528.

The training data and input dataset 1524 may be generated, stored, and accessed using the same or different mechanisms. Similar to the training data, input dataset 1524 may include a plurality of rows and a plurality of columns with the plurality of rows referred to as observations or records, and the columns referred to as variables that are associated with an observation. Input dataset 1524 may be transposed.

Similar to the training data, input dataset 1524 may be stored on fifth computer-readable medium 1508 or on one or more computer-readable media of distributed computing system 1528 and accessed by prediction device 1500 using fifth communication interface 1506. Data stored in input dataset 1524 may be a sensor measurement or a data communication value, for example, from a sensor 1513, may be generated or captured in response to occurrence of an event or a transaction, generated by a device such as in response to an interaction by a user with the device, for example, from a second keyboard 1512 or a second mouse 1514, etc. The data stored in input dataset 1524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 1524 may be captured at different time points periodically, intermittently, when an event occurs, etc. One or more columns may include a time value. Similar to the training data, data stored in input dataset 1524 may be generated as part of the IoT, and some or all data may be pre- or post-processed by an ESPE.

Similar to the training data, input dataset 1524 may be stored in various compressed formats such as a coordinate format, a compressed sparse column format, a compressed sparse row format, etc. Input dataset 1524 further may be stored using various structures as known to those skilled in the art including a file system, a relational database, a system of tables, a structured query language database, etc. on prediction device 1500 and/or on distributed computing system 1528. Prediction device 1500 and/or distributed computing system 1528 may coordinate access to input dataset 1524 that is distributed across a plurality of computing devices. For example, input dataset 1524 may be stored in a cube distributed across a grid of computers as understood by a person of skill in the art. As another example, input dataset 1524 may be stored in a multi-node Hadoop® cluster. As another example, input dataset 1524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 1524.

Referring to FIG. 16, example operations of prediction application 1522 are described. Additional, fewer, or different operations may be performed depending on the embodiment of prediction application 1522. The order of presentation of the operations of FIG. 16 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1600, a thirteenth indicator may be received that indicates input dataset 1524. For example, the thirteenth indicator indicates a location and a name of input dataset 1524. As an example, the thirteenth indicator may be received by prediction application 1522 after selection from a user interface window or after entry by a user into a user interface window. In an alternative embodiment, input dataset 1524 may not be selectable. For example, a most recently created dataset may be used automatically. As another example, input dataset 1524 may be provided automatically as part of integration with model tuning application 222, selection manager application 312, model manager application 412, and/or model worker application 432.

In an operation 1602, a fourteenth indicator may be received that indicates selected model data 320. For example, the fourteenth indicator indicates a location and a name of selected model data 320. As an example, the fourteenth indicator may be received by prediction application 1522 after selection from a user interface window or after entry by a user into a user interface window. In an alternative embodiment, selected model data 320 may not be selectable. For example, most recently created model data may be used automatically. As another example, selected model data 320 may be provided automatically as part of integration with model tuning application 222, selection manager application 312, model manager application 412, and/or model worker application 432.

In an operation 1604, a model description is read from selected model data 320.

In an operation 1606, a model is instantiated with information read from the model description. For example, the type of model, its hyperparameter values, and other characterizing elements are read and used to instantiate the model.

In an operation 1608, an observation vector is read from input dataset 1524.

In an operation 1610, the observation vector is pre-processed, if any, pre-processing is performed.

In an operation 1612, the optionally pre-processed observation vector is input to the instantiated model.

In an operation 1614, an output of the instantiated model is received. The output may indicate a predicted characteristic of the observation vector.

In an operation 1616, the predicted characteristic may be output, for example, by storing the predicted characteristic with the observation vector to predicted dataset 1526. In addition, or in the alternative, the predicted characteristic may be presented on second display 1516, printed on second printer 1520, a message including the predicted characteristic may be sent to another computing device using fifth communication interface 1506, an alarm or other alert signal may be sounded through second speaker 1518, etc.

In an operation 1618, a determination is made concerning whether or not input dataset 1524 includes another observation vector. When input dataset 1524 includes another observation vector, processing continues in an operation 1620. When input dataset 1524 does not include another observation vector, processing continues in an operation 1622.

In operation 1620, a next observation vector is read from input dataset 1524, and processing continues in operation 1610.

In operation 1622, processing stops and cleanup is performed as needed.

There are applications for model tuning application 222, selection manager application 312, model manager application 412, model worker application 432, and/or prediction application 1522 in many areas such as process control and equipment health monitoring, image processing and classification, data segmentation, data analysis, etc. Model tuning application 222, selection manager application 312, model manager application 412, and model worker application 432 automatically tune hyperparameters of modeling algorithms that include decision tree models, forest models, gradient boosting models, neural network models, support vector machine models, factorization machine models, etc. Given the inherent expense of training numerous candidate models, model tuning application 222, selection manager application 312, model manager application 412, and model worker application 432 provide efficient distributed and parallel computing device implementations for training and tuning models with multiple objectives while applying any linear and/or nonlinear constraints. The presented results demonstrate the improved model accuracies and the improved execution times.

The explosion of digital data is generating many opportunities for big data analytics, which in turn provides many opportunities for tuning predictive models to capitalize on the information contained in the data—to make better predictions that lead to better decisions. Hyperparameter selection system 100 supports better decision making by providing a system that can identify and evaluate many more hyperparameter configurations in parallel by allocating the computing devices of worker system 106 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:
receive a selection of a plurality of search methods;
(A) determine a plurality of hyperparameter configurations using a search method of a search method type selected from the plurality of search methods, wherein each hyperparameter configuration of the plurality of hyperparameter configurations includes a value for each hyperparameter of a plurality of hyperparameters, wherein each hyperparameter configuration of the plurality of hyperparameter configurations is a unique combination of values for the plurality of hyperparameters, wherein the plurality of hyperparameter configurations are identified based on a predefined model type;
(B) select a hyperparameter configuration from the plurality of hyperparameter configurations;
(C) determine if the selected hyperparameter configuration satisfies a linear constraint on at least one hyperparameter of the plurality of hyperparameters;
(D) when the selected hyperparameter configuration does not satisfy the linear constraint,
determine if a projection of the selected hyperparameter configuration is included in a first cache, wherein the first cache stores pairs of hyperparameter configurations, wherein each pair of the pairs includes a previously selected hyperparameter configuration and a projected hyperparameter configuration computed from the previously selected hyperparameter configuration, wherein determining if the projection of the selected hyperparameter configuration is included in the first cache includes a comparison of the selected hyperparameter configuration with the previously selected hyperparameter configuration of each pair stored in the first cache;
when the projection is included in the first cache, extract the projected hyperparameter configuration of a matching pair of the pairs from the first cache using the selected hyperparameter configuration and replace the selected hyperparameter configuration with the extracted projected hyperparameter configuration of the matching pair of the pairs in the plurality of hyperparameter configurations;
when the projection is not included in the first cache, assign a projection computation for the selected hyperparameter configuration to a session;
receive a computed projected hyperparameter configuration from the session for the selected hyperparameter configuration when the projection computation is complete by the session;
store the received computed projected hyperparameter configuration and the selected hyperparameter configuration to the first cache; and replace the selected hyperparameter configuration with the received computed projected hyperparameter configuration in the plurality of hyperparameter configurations;

(E) repeat (B) through (D) until each hyperparameter configuration of the plurality of hyperparameter configurations in (A) is selected;

(F) compute an objective function value for each hyperparameter configuration of the plurality of hyperparameter configurations using a predefined objective function by training a model of the predefined model type using a respective hyperparameter configuration of the plurality of hyperparameter configurations and scoring the trained model;

(G) repeat (A) through (F) until each search method of the plurality of search methods is selected in (A);

(H) identify a best hyperparameter configuration of the plurality of hyperparameter configurations based on an extremum value of the computed objective function value for each hyperparameter configuration of the plurality of hyperparameter configurations; and (I) output the identified best hyperparameter configuration.

2. The non-transitory computer-readable medium of claim 1, wherein determining if the selected hyperparameter configuration satisfies the linear constraint comprises:
computing a constraint value defined for the linear constraint using the value of the at least one hyperparameter of the plurality of hyperparameters included in the selected hyperparameter configuration; and
comparing the computed constraint value to a boundary value defined for the linear constraint based on an inequality defined for the linear constraint,
wherein, when the computed constraint value satisfies the boundary value based on the inequality, the selected hyperparameter configuration satisfies the linear constraint.

3. The non-transitory computer-readable medium of claim 1, wherein the projected hyperparameter configuration is computed by mapping the selected hyperparameter configuration to the computed, projected hyperparameter configuration.

4. The non-transitory computer-readable medium of claim 1, wherein the projected hyperparameter configuration is computed by constructing tangent directions to the linear constraint and using the constructed tangent directions as search directions.

5. The non-transitory computer-readable medium of claim 1, wherein the projected hyperparameter configuration is computed using a linear programming solver for linear problems with variables transformed by introducing two new variables.

6. The non-transitory computer-readable medium of claim 5, wherein the two new variables are defined using:

$$\hat{h}-h=r-s$$

$$r,s \geq 0$$

$$r_i s_i=0, \text{ for } i=1,\ldots,N_v$$

$$|\hat{h}-h|=r+s$$

where $\hat{h}$ is a vector of the plurality of hyperparameters included in the projected hyperparameter configuration, h is a vector of the plurality of hyperparameters included in the selected hyperparameter configuration, r, s are the introduced two new variables, and $N_v$ is a number of the plurality of hyperparameters included in the selected hyperparameter configuration.

7. The non-transitory computer-readable medium of claim 6, wherein an equivalent smooth problem becomes $$\underset{\hat{h} \in R^{N_v}, r \in R^{N_v}, s \in R^{N_v}}{\text{minimize}} = \sum_{i=1}^{N_v} (r_i + s_i)$$

subject to $\hat{h} - r + s = h$ $b_\ell \leq A\hat{h} \leq b_u$ $h_\ell \leq \hat{h} \leq h_u$ $r, s \geq 0$ where the optimality conditions imply that $r_i s_i = 0$, $b_\ell$ is a lower bound defined for the linear constraint, A is a matrix in $\mathbb{R}^{N_v \times 1}$ defined for the linear constraint, $b_u$ is an upper bound defined for the linear constraint, $h_\ell$ is a vector of lower bounds defined for the linear constraint assuming that A=I, I is an identity matrix, and $h_u$ is a vector of upper bounds defined for the linear constraint assuming that A=I.

8. The non-transitory computer-readable medium of claim 1, wherein the session includes a computing device different from the first computing device.

9. The non-transitory computer-readable medium of claim 1, wherein after (D) and before (E), any hyperparameter configuration of the plurality of hyperparameter configurations that is within a predefined cache tolerance value of any hyperparameter configuration stored in a second cache is removed from the plurality of hyperparameter configurations.

10. The non-transitory computer-readable medium of claim 1, wherein the computer-readable instructions further cause the first computing device to:
select a final session from a plurality of sessions;
assign the identified best hyperparameter configuration to the selected final session;
request training of a final model of the predefined model type by the selected final session with the identified best hyperparameter configuration;
receive the trained final model; and
store the received final model.

11. The non-transitory computer-readable medium of claim 10, wherein the computer-readable instructions further cause the first computing device to:
read an observation vector from a second dataset;
instantiate a prediction model from the stored final model;
compute a predicted characteristic of the read observation vector using the instantiated prediction model; and
output the computed predicted characteristic of the read observation vector.

12. The non-transitory computer-readable medium of claim 1, wherein the predefined model type is selected from the group consisting of a decision tree model type, a factorization machine model type, a forest model type, a gradient boosting tree model type, a neural network model type, and a support vector machine model type.

13. The non-transitory computer-readable medium of claim 1, wherein the search method type is one or more of a Latin hypercube sampling search method, a genetic algorithm search method, and a generating set search method.

14. The non-transitory computer-readable medium of claim 1, wherein the search method type sorts child points based on a creation tag associated with each hyperparameter configuration of the plurality of hyperparameter configurations, wherein the creation tag indicates when the associated hyperparameter configuration is used to compute the objective function value.

15. The non-transitory computer-readable medium of claim 1, wherein (F), (H), and (I) include a plurality of predefined objective functions, wherein the predefined objective function is one of the plurality of predefined objective functions.

16. The non-transitory computer-readable medium of claim 15, wherein the identified best hyperparameter configuration of the plurality of hyperparameter configurations includes a nondominated plurality of hyperparameter configurations selected based on values for each of the plurality of predefined objective functions.

17. The non-transitory computer-readable medium of claim 16, wherein, before (H), the computer-readable instructions further cause the first computing device to repeat (A) through (G) until processing is stopped.

18. The non-transitory computer-readable medium of claim 17, wherein, after (G) and before (H), the computer-readable instructions further cause the first computing device to update the nondominated plurality of hyperparameter configurations.

19. The non-transitory computer-readable medium of claim 18, wherein the search method type is a generating set search method, wherein two instances of the generating set search method are created for each hyperparameter of the plurality of hyperparameters used by the linear constraint.

20. The non-transitory computer-readable medium of claim 19, wherein each created generating set search method instance selects a next hyperparameter configuration from the nondominated plurality of hyperparameter configurations and selects a search direction that is orthogonal relative to another search direction selected by another created generating set search method instance to add a new hyperparameter configuration for evaluation to the plurality of hyperparameter configurations in (A).

21. The non-transitory computer-readable medium of claim 1, wherein, before (H), the computer-readable instructions further cause the first computing device to repeat (A) through (G) until processing is stopped.

22. The non-transitory computer-readable medium of claim 1, wherein the search method type is a generating set search method, wherein two instances of the generating set search method are created for each hyperparameter of the plurality of hyperparameters used by the linear constraint.

23. The non-transitory computer-readable medium of claim 1, wherein (C) and (D) are performed for a plurality of linear constraints, wherein the linear constraint is one of the plurality of linear constraints.

24. A computing device comprising:
a processor; and
a computer-readable medium operably coupled to the processor, the computer-readable medium having computer-readable instructions stored thereon that, when executed by the processor, cause the computing device to
receive a selection of a plurality of search methods;
(A) determine a plurality of hyperparameter configurations using a search method of a search method type selected from the plurality of search methods, wherein each hyperparameter configuration of the plurality of hyperparameter configurations includes a value for each hyperparameter of a plurality of hyperparameters, wherein each hyperparameter configuration of the plurality of hyperparameter configurations is a unique combination of values for the plurality of hyperparameters, wherein the plurality of hyperparameter configurations are identified based on a predefined model type;
(B) select a hyperparameter configuration from the plurality of hyperparameter configurations;
(C) determine if the selected hyperparameter configuration satisfies a linear constraint on at least one hyperparameter of the plurality of hyperparameters;
(D) when the selected hyperparameter configuration does not satisfy the linear constraint,
determine if a projection of the selected hyperparameter configuration is included in a first cache, wherein the first cache stores pairs of hyperparameter configurations, wherein each pair of the pairs includes a previously selected hyperparameter configuration and a projected hyperparameter configuration computed from the previously selected hyperparameter configuration, wherein determining if the projection of the selected hyperparameter configuration is included in the first cache includes a comparison of the selected hyperparameter configuration with the previously selected hyperparameter configuration of each pair stored in the first cache;
when the projection is included in the first cache, extract the projected hyperparameter configuration of a matching pair of the pairs from the first cache using the selected hyperparameter configuration and replace the selected hyperparameter configuration with the extracted projected hyperparameter configuration of the matching pair of the pairs in the plurality of hyperparameter configurations;
when the projection is not included in the first cache, assign a projection computation for the selected hyperparameter configuration to a session;
receive a computed projected hyperparameter configuration from the session for the selected hyperparameter configuration when the projection computation is complete by the session;
store the received computed projected hyperparameter configuration and the selected hyperparameter configuration to the first cache; and
replace the selected hyperparameter configuration with the received computed projected hyperparameter configuration in the plurality of hyperparameter configurations;
(E) repeat (B) through (D) until each hyperparameter configuration of the plurality of hyperparameter configurations in (A) is selected;
(F) compute an objective function value for each hyperparameter configuration of the plurality of hyperparameter configurations using a predefined objective function by training a model of the predefined model type using a respective hyperparameter configuration of the plurality of hyperparameter configurations and scoring the trained model;
(G) repeat (A) through (F) until each search method of the plurality of search methods is selected in (A);
(H) identify a best hyperparameter configuration of the plurality of hyperparameter configurations based on an extremum value of the computed objective function value for each hyperparameter configuration of the plurality of hyperparameter configurations; and (I) output the identified best hyperparameter configuration.

25. A method of selecting tuned hyperparameter values for training a machine learning model, the method comprising:
receiving, by a computing device, a selection of a plurality of search methods;
(A) determining, by the computing device, a plurality of hyperparameter configurations using a search method of a search method type selected from the plurality of search methods, wherein each hyperparameter configuration of the plurality of hyperparameter configurations includes a value for each hyperparameter of a plurality of hyperparameters, wherein each hyperparameter configuration of the plurality of hyperparameter configurations is a unique combination of values for the plurality of hyperparameters, wherein the plurality of hyperparameter configurations are identified based on a predefined model type;
(B) selecting, by the computing device, a hyperparameter configuration from the plurality of hyperparameter configurations;
(C) determining, by the computing device, if the selected hyperparameter configuration satisfies a linear constraint on at least one hyperparameter of the plurality of hyperparameters;
(D) when the selected hyperparameter configuration does not satisfy the linear constraint,
determining, by the computing device, if a projection of the selected hyperparameter configuration is included in a first cache, wherein the first cache stores pairs of hyperparameter configurations, wherein each pair of the pairs includes a previously selected hyperparameter configuration and a projected hyperparameter configuration computed from the previously selected hyperparameter configuration, wherein determining if the projection of the selected hyperparameter configuration is included in the first cache includes a comparison of the selected hyperparameter configuration with the previously selected hyperparameter configuration of each pair stored in the first cache;
when the projection is included in the first cache, extracting, by the computing device, the projected hyperparameter configuration of a matching pair of the pairs from the first cache using the selected hyperparameter configuration and replace the selected hyperparameter configuration with the extracted projected hyperparameter configuration of the matching pair of the pairs in the plurality of hyperparameter configurations;
when the projection is not included in the first cache,
assigning, by the computing device, a projection computation for the selected hyperparameter configuration to a session;
receiving, by the computing device, a computed, projected hyperparameter configuration from the session for the selected hyperparameter configuration when the projection computation is complete by the session;
storing, by the computing device, the received, computed, projected hyperparameter configuration and the selected hyperparameter configuration to the first cache; and
replacing, by the computing device, the selected hyperparameter configuration with the received, computed, projected hyperparameter configuration in the plurality of hyperparameter configurations;
(E) repeating, by the computing device, (B) through (D) until each hyperparameter configuration of the plurality of hyperparameter configurations in (A) is selected;
(F) computing, by the computing device, an objective function value for each hyperparameter configuration of the plurality of hyperparameter configurations using a predefined objective function by training a model of the predefined model type using a respective hyperparameter configuration of the plurality of hyperparameter configurations and scoring the trained model;
(G) repeating, by the computing device, (A) through (F) until each search method of the plurality of search methods is selected in (A);
(H) identifying, by the computing device, a best hyperparameter configuration of the plurality of hyperparameter configurations based on an extremum value of the computed objective function value for each hyperparameter configuration of the plurality of hyperparameter configurations; and
(I) outputting, by the computing device, the identified best hyperparameter configuration.

26. The method of claim 25, wherein determining if the selected hyperparameter configuration satisfies the linear constraint comprises:
computing a constraint value defined for the linear constraint using the value of the at least one hyperparameter of the plurality of hyperparameters included in the selected hyperparameter configuration; and
comparing the computed constraint value to a boundary value defined for the linear constraint based on an inequality defined for the linear constraint,
wherein, when the computed constraint value satisfies the boundary value based on the inequality, the selected hyperparameter configuration satisfies the linear constraint.

27. The method of claim 25, wherein the projected hyperparameter configuration is computed by mapping the selected hyperparameter configuration to the computed projected hyperparameter configuration.

28. The method of claim 25, wherein the projected hyperparameter configuration is computed by constructing tangent directions to the linear constraint and using the constructed tangent directions as search directions.

29. The method of claim 25, wherein the projected hyperparameter configuration is computed using a linear programming solver for linear problems with variables transformed by introducing two new variables.

30. The method of claim 29, wherein the two new variables are defined using:

$$\hat{h}-h=r-s$$

$$r,s \geq 0$$

$$r_i s_i = 0, \text{ for } i=1,\ldots,N_v$$

$$|\hat{h}-h|=r+s$$

where $\hat{h}$ is a vector of the plurality of hyperparameters included in the projected hyperparameter configuration, h is a vector of the plurality of hyperparameters included in the selected hyperparameter configuration, r, s are the introduced two new variables, and $N_v$ is a number of the plurality of hyperparameters included in the selected hyperparameter configuration.

* * * * *

UNITED STATES PATENT AND TRADEMARK OFFICE
CERTIFICATE OF CORRECTION

PATENT NO. : 11,093,833 B1
APPLICATION NO. : 17/081118
DATED : August 17, 2021
INVENTOR(S) : Gardner et al.

It is certified that error appears in the above-identified patent and that said Letters Patent is hereby corrected as shown below:

In the Specification

Column 17, Line 61:
Delete the phrase "$TUA = \frac{\mu - w}{N/2(N-1)}$" and replace with --$TAU = \frac{\mu - w}{N/2(N-1)}$--.

Column 19, Line 24:
Delete the phrase "SAS Viya™" and replace with --SAS® Viya™--.

Column 20, Line 40:
Delete the phrase "neura/Net action set of SAS Viya™" and replace with --*neuralNet* action set of SAS® Viya™--.

Column 32, Line 8:
Delete the phrase "$f_2(h)$," and replace with --$f_2(h_1)$,--.

Column 32, Line 17:
Delete the phrase "$f(h) \le f(h_2)$" and replace with --$f(h_1) \le f(h_2)$--.

Column 32, Line 18:
Delete the phrase "$f_i(h_i) < f_i(h_2)$." and replace with --$f_i(h_1) < f_i(h_2)$.--.

Column 32, Line 27:
Delete the phrase "$\mathcal{F} = \text{front}(P_i)$;" and replace with --$\mathcal{F}_i = \text{front}(P_i)$;--.

Column 37, Line 44:
Delete the phrase "$d(\mathcal{F}_{N_k+1}, \mathcal{F} \mathcal{F}_{N_k}) = \sum_{p \in F_{N_k+1}} d(p, \mathcal{F}_{N_k}) = \sum_{p \in N} d(p, \mathcal{F}_{N_k})$," and replace with --$d(\mathcal{F}_{N_k+1}, \mathcal{F}_{N_k}) = \sum_{p \in F_{N_k+1}} d(p, \mathcal{F}_{N_k}) = \sum_{p \in N} d(p, \mathcal{F}_{N_k})$--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,093,833 B1

Column 40, Line 54:
Delete the phrase "be is a vector" and replace with --$b_\ell$ is a vector--.

Column 42, Line 20:
Delete the phrase "subject to $c_\ell \leq c(\Theta(h))c_u$" and replace with --subject to $c_\ell \leq c(\Theta(h)) \leq c_u$--.